US007140055B2

(12) United States Patent
Bishop et al.

(10) Patent No.: US 7,140,055 B2
(45) Date of Patent: Nov. 28, 2006

(54) LIGHTWEIGHT MOBILE LIFT-ASSISTED PATIENT TRANSPORT DEVICE

(76) Inventors: Joseph Bishop, 7 Riverside Dr., Spring City, PA (US) 19475; Michael W. Catoe, 205 Colleton Ct., Lexington, SC (US) 29072; David G. Algie, 6407 W. 62nd St., Indianapolis, IN (US) 46278; Ian G. Algie, 1030 Harwood Dr., Columbus, OH (US) 43228

( * ) Notice: Subject to any disclaimer, the term of this patent is extended or adjusted under 35 U.S.C. 154(b) by 0 days.

(21) Appl. No.: 10/849,500

(22) Filed: May 20, 2004

(65) Prior Publication Data

US 2005/0125900 A1 Jun. 16, 2005

Related U.S. Application Data

(63) Continuation-in-part of application No. 10/621,304, filed on Jul. 18, 2003, now abandoned.

(51) Int. Cl.

| | |
|---|---|
| ***A61G 1/02*** | (2006.01) |
| ***A61G 7/10*** | (2006.01) |
| *B62B 19/00* | (2006.01) |

(52) U.S. Cl. .............................. 5/611; 5/86.1; 296/20; 280/9

(58) Field of Classification Search ............... 5/81.1 R, 5/611, 620, 626, 627; 296/20; 280/640, 280/8, 9

See application file for complete search history.

(56) References Cited

U.S. PATENT DOCUMENTS

| | | | | | |
|---|---|---|---|---|---|
| 2,319,008 | A | * | 5/1943 | McCormack | 296/20 |
| 2,833,587 | A | * | 5/1958 | Saunders | 5/611 |
| 3,316,581 | A | * | 5/1967 | Hornsby | 16/44 |
| 3,426,367 | A | * | 2/1969 | Bradford | 5/626 |
| 3,580,592 | A | * | 5/1971 | Schrecengost | 280/8 |
| 3,752,527 | A | * | 8/1973 | Ferneau et al. | 296/20 |
| 3,759,565 | A | * | 9/1973 | Ferneau | 296/20 |
| 3,826,528 | A | * | 7/1974 | East | 296/20 |
| 3,936,893 | A | * | 2/1976 | Anderson et al. | 5/86.1 |
| 3,980,334 | A | * | 9/1976 | Ferneau et al. | 296/20 |
| 4,074,407 | A | * | 2/1978 | Christensen | 29/894 |
| 4,250,593 | A | * | 2/1981 | Sachser | 16/45 |
| 4,389,066 | A | * | 6/1983 | Weir et al. | 296/20 |
| 4,767,148 | A | * | 8/1988 | Ferneau et al. | 296/20 |
| 5,022,105 | A | * | 6/1991 | Catoe | 5/611 |
| 5,165,141 | A | * | 11/1992 | Soltani | 5/510 |
| 5,176,393 | A | * | 1/1993 | Robertson et al. | 280/250.1 |
| 5,179,746 | A | * | 1/1993 | Rogers | 5/626 |

(Continued)

*Primary Examiner*—Michael Safavi
(74) *Attorney, Agent, or Firm*—Buchanan Ingersoll & Rooney, PC

(57) ABSTRACT

A lift-assisted device having a patient support structure, a base, and an undercarriage. The device can be powered by a pneumatic cylinder and a compressed gas source. The undercarriage can be a scissors linkage having at least one first member being slidably connected to the patient support structure an upper end of the first member and pivotally connected to the base at a lower end of the first member, and at least one second scissors linkage member, the second scissors linkage member being pivotally connected to the first scissors linkage member. An upper end of the second member is pivotally connected to the patient support structure, and a lower end of the second member is pivotally connected to the base. The pneumatic cylinder is arranged for moving the upper end of the first member and the lower end of the second member with respect to the patient support structure.

34 Claims, 12 Drawing Sheets

U.S. PATENT DOCUMENTS

| | | | | |
|---|---|---|---|---|
| 5,230,113 | A * | 7/1993 | Foster et al. | 5/83.1 |
| 5,365,622 | A * | 11/1994 | Schirmer | 5/611 |
| 5,377,372 | A * | 1/1995 | Rudolf et al. | 5/600 |
| 5,575,026 | A * | 11/1996 | Way et al. | 5/611 |
| 6,219,864 | B1 * | 4/2001 | Ellis et al. | 5/611 |
| 6,499,163 | B1 * | 12/2002 | Stensby | 5/618 |
| 6,526,611 | B1 * | 3/2003 | Flynn et al. | 5/611 |
| 6,654,973 | B1 * | 12/2003 | Van Den Heuvel et al. | 5/611 |
| 6,845,533 | B1 * | 1/2005 | Tulette | 5/626 |
| 2004/0034935 | A1 * | 2/2004 | Ferneau et al. | 5/618 |

* cited by examiner

LIGHTWEIGHT MOBILE LIFT-ASSISTED PATIENT TRANSPORT DEVICE

This application is a continuation-in-part of application Ser. No. 10/621,304, filed in the United States on Jul. 18, 2003 now abandoned, the entire contents of which are hereby incorporated by reference.

FIELD OF THE INVENTION

The present invention relates generally to mobile lift-assisted transport devices for transporting patients. More specifically, the present invention relates to a mobile lift-assisted transport device which is able to easily be elevated and lowered.

BACKGROUND

A busy Emergency Medical Services (EMS) crew may handle as many as 20 calls during the work shift. Typically one or more such calls involve moving a patient from a field location, such as his home or the scene of an accident, to a health care facility such as an emergency room at a hospital.

Providing transport for the patient involves various procedures for appropriately securing the patient in different transport vehicles for transport to the hospital or other appropriate destination. Such transport involves a constant risk to the EMS crew and to the patient. The risk arises from the activity involving the EMS crew, usually two persons, lifting and moving the patients. There is also the danger that the patient may be dropped or roughly handled while being moved. As for the EMS crew, they are routinely faced with lifting situations which can and often do result in significant and even crippling back injuries. This can occur either because of the repetitive lifting of average size patients or occasional lifting of large patients.

The dangers of lifting-related injury is compounded because an EMS crew must lift a patient approximately 7 times during the course of a call. For example, for lifting purposes only, in an emergency involving a 200 lb. man the crew will typically: 1) lift the patient to a mobile, wheeled device placed at its lowest height adjustment; 2) lift the device and patient to the maximum height adjustment, and then move the device and patient to an ambulance; 3) lower the device and patient back to the lowest height adjustment; 4) lift the device and patient into the ambulance; 5) upon arrival at the medical facility, remove the device and patient from the ambulance and lower them to the ground; 6) again, lift the device and patient to the maximum height adjustment, and then move the device and patient into the facility; and 7) lift to transfer the patient from the device to a bed at the facility. During this very typical call the crew has lifted or lowered the patient seven times, thereby doing an amount of work equivalent to lifting more than 1400 pounds when the weight of the device is included.

A particularly difficult part of this process results from the fact that the typical device that is used in the field, e.g., a stretcher for transfer of patients via ambulances, is not well-designed for lifting and lowering. Because of the location of the undercarriage and supporting structure, the members of the EMS crew cannot simply stand on each side of the device and lift or lower it using proper lifting techniques with their legs. Rather, to avoid hitting the undercarriage with their knees, they must turn their bodies sideways, imposing a torquing motion on their backs as they lift and lower. This consequence results in a significant number of disabling back injuries to EMS personnel each year. In addition, because of the strength that is required to lift and lower a device with this type of motion, smaller people, are effectively precluded from working as emergency medical technicians.

Wheeled cots have changed little since their advent approximately sixty years ago. The advent of the "one and a half man" cot in the late 1980s changed the way the patients were loaded and unloaded from the transport vehicle. The "one and a half man" cot has loading wheels at the head of the cot which are placed on the bed of the transport vehicle. In order to load the cot, one crew member supports the cot by the foot end while the other crew member reaches under the cot to manually retract the undercarriage. The cot is then pushed into the transport vehicle by one or both EMS crew members. The reverse occurs at the receiving facility, where the cot is pulled out of the patient compartment until only the loading wheels are in the transport vehicle. While one crew member supports the weight of the patient and cot at the foot end, the other crew member again reaches under the cot and manually lowers the undercarriage. This process is fraught with risk for both the EMS crew and the patient.

The loading height of a vehicle is the dimension measured from the ground to the floor surface of the patient compartment of the vehicle. Many transport vehicles have loading heights that far exceed the approximately 30 inches associated with van type ambulances. For example, a loading height of 35 inches is not uncommon. The result is that the loading wheels of the commonly used manual type cots do not reach the floor of the transport vehicle. In order to facilitate loading, the crew performs a lifting maneuver much like a shoulder shrug to lift the heavy end of the cot where the loading wheels are located into the compartment. Serious injuries to the shoulder joint are a common result of this effort. The patient is also at risk during this maneuver if the cot tips or falls, or if only one wheel of the cot engages the floor of the transport vehicle.

Cots have also been limited by their weight to more compact sizes, making them even less suitable for transporting patients into and out of vehicles having high loading heights.

Further, the cots occasionally collapse, particularly if the patient is heavy, causing the patient to suffer a sudden drop. When the EMS crew member attempts to prevent the cot from collapsing or tipping, the crew member can be injured by being struck by the cot.

Several transport devices with lift-assisted mechanisms have been proposed. One example of such a device is found in U.S. Pat. No. 2,833,587 to Saunders which discloses an adjustable height gurney which includes power cylinders provided in the legs of the upper frame and connected to two of the intersecting lever arms (one on each side of the gurney). To operate the cylinders, the EMS technician repeatedly works the handle of a grip up and down to actuate the hydraulic pump. As an alternative, a valve connects the power cylinders to the fluid reservoir, which valve may be opened by a hand lever connected thereto. Both mechanisms for actuating the hydraulic pump cause problems in operation. Use of the handle, which requires repeatedly working the handle up and down is time consuming and be quite difficult when a patient is on a gurney. To remove the gurney from the ambulance, or to place it in the ambulance, the EMS technicians lifts the stretcher, and the patient, from the ambulance to the ground, and visa versa, after which the technicians can use the grip or hand lever to raise the upper carriage.

Another example is set forth in U.S. Pat. No. 5,022,105, which provides a mobile lift-assisted patient transport device. Another example is presented in application Ser. No. 09/863,324, filed on May 24, 2001.

SUMMARY

One embodiment of a lift-assisted device comprises a patient support structure having a movable yoke, a base, and an undercarriage extending between the patient support structure and the base. At least one pneumatic cylinder extends between the movable yoke and a part of the patient support structure for applying a driving force on the movable yoke to raise or lower the patient support structure with respect to the base.

Another aspect of the invention involves a lift-assisted device comprising a patient support structure having a movable part, a base, an undercarriage extending between the patient support structure and the base, a power source for applying a driving force to raise or lower the patient support structure with respect to the base, and a height adjustment and locking mechanism including a locking bar positioned for locking engagement with the movable part of the patient support structure.

Another aspect of the mobile patient transport device comprises a patient support structure, a base having wheels for moving the device over a surface, an undercarriage arranged between the patient support structure and the base adapted for raising and lowering the patient support structure with respect to the base. At least one of the patient support structure, the base, and the undercarriage includes a composite material of resin and carbon fiber.

BRIEF DESCRIPTION OF THE DRAWINGS

Preferred embodiments of the invention are disclosed in the following description and illustrated in the accompanying drawings.

DETAILED DESCRIPTION OF THE PREFERRED EMBODIMENTS

Figure 1:
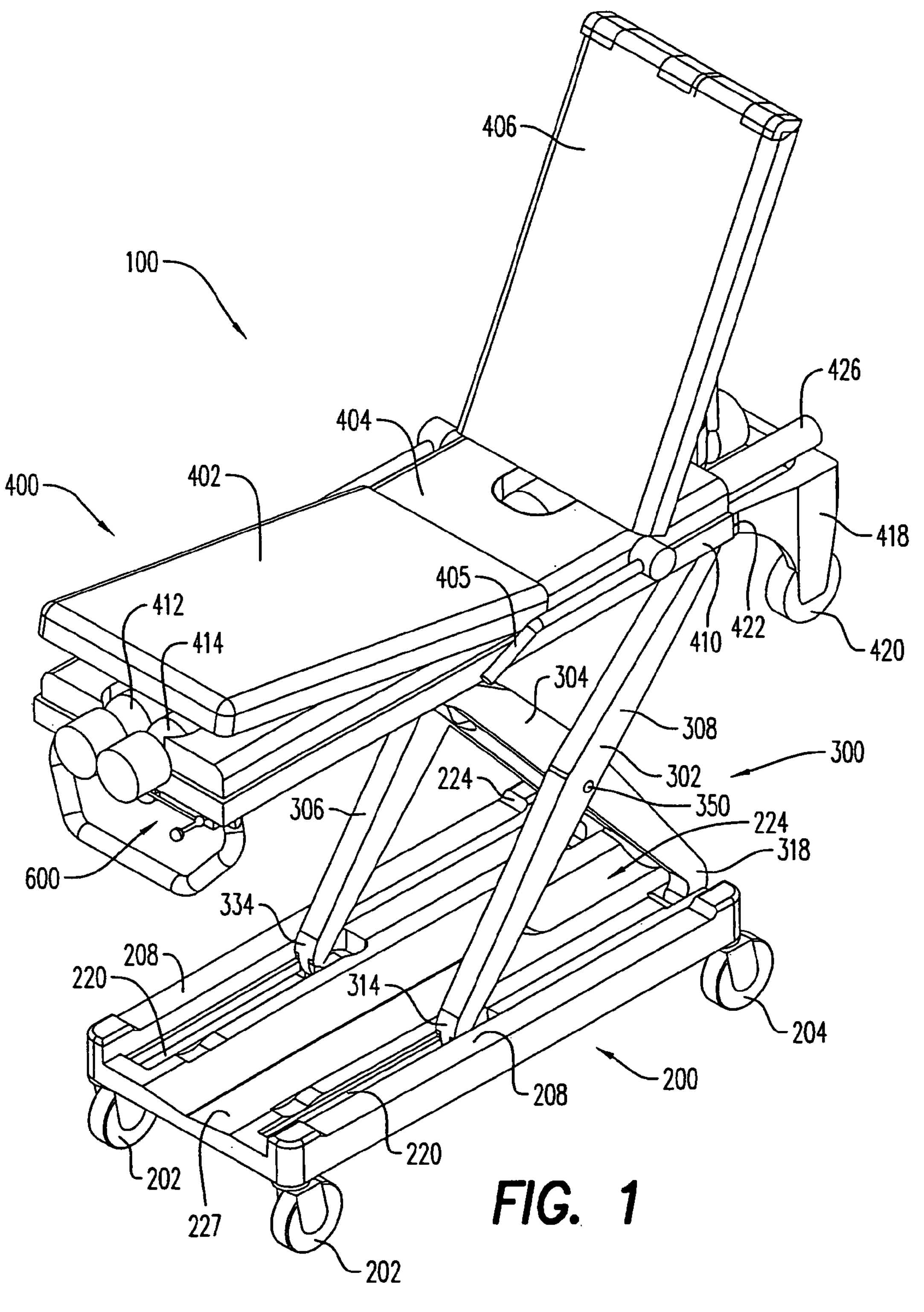
FIG. 1 is a perspective view of an exemplary embodiment of a lift-assisted device according to the present invention.

FIG. 1 illustrates a perspective view of an exemplary embodiment of a mobile lift-assisted device 100. The mobile lift-assisted device 100 is generally used to transport patients from one location to another, while allowing a patient to be placed in a desired position. Furthermore, the mobile lift-assisted device 100 is able to elevate and lower an object or person to a desired height.

As shown in the exemplary embodiment in FIG. 1, the lift-assisted device 100 generally includes three main structural portions which include: the base 200, the undercarriage 300, and the patient support structure 400. A height adjustment and locking system 600 controls the height of the patient support structure 400.

Advantageously, most of the components of the base 200, undercarriage 300, and patient support structure 400 are constructed using monocoque or similar construction techniques utilizing carbon-fiber composites or like material.

The base 200 is the terrain-engaging section of the device 100. The base 200 provides attachment points for the wheels upon which the device 100 and has attachment locations for the scissors linkages of the undercarriage 300.

The main body of the base 200 can advantageously be a monocoque hollow body molded to include attachment points for the wheels and scissors linkages, recesses for components of the undercarriage to fit into when the device 100 is in a lowered position, and mounting brackets.

The base 200 can have two front (foot end) wheels 202 and two rear (head end) wheels 204, located approximately at the corners of the base 200. Additional wheels can also be provided on the base 200, for example, along the sides of the base 200 between the front wheels 202 and the rear wheels 204 or at the foot end of head end of the base 200. Such additional wheels can provide increased stability over rolling surfaces and can distribute the load.

Figure 2:
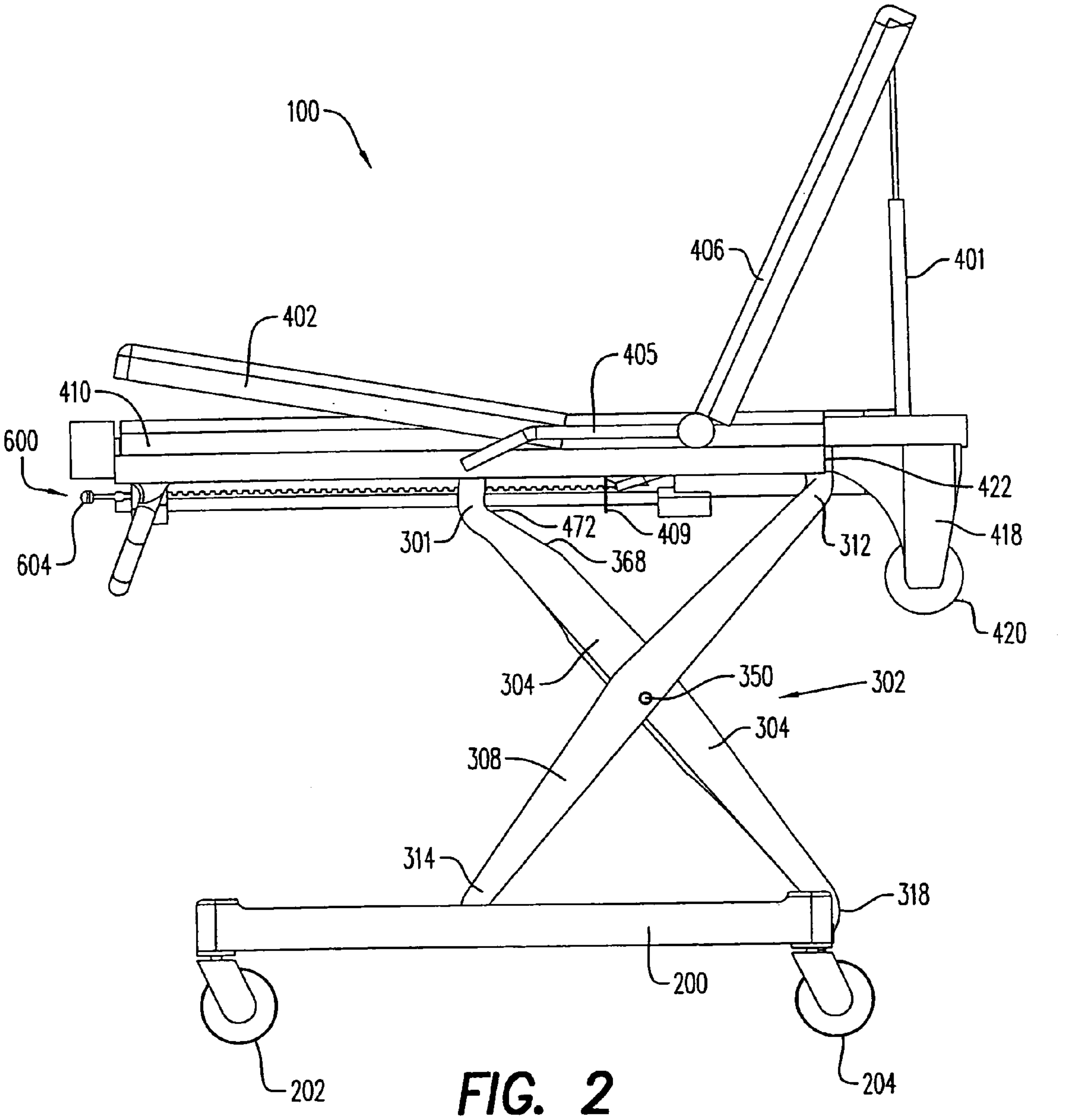
FIG. 2 is side view of the lift-assisted device.
Figure 6:
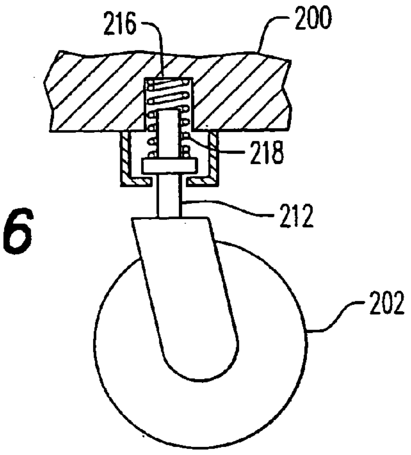
FIG. 6 illustrates a wheel for the base of a lift-assisted device.

As illustrated in FIGS. 1 and 2, the front and rear wheels 202 and 204 can be castered to allow the wheels to swivel. Shoulders 216 can be formed in the base 200 to cooperate with the caster wheels. In one embodiment, the wheels can be spring loaded to allow the wheels to move up and down to accommodate irregularities in the surface over which the mobile lift assisted device is traveling. FIG. 6 illustrates an embodiment of a spring loaded wheel in which caster bolts 212 attach the wheels to the base and include a spring 218 arranged between the bolt 212 and a shoulder 216 of the base.

The device 100 can include wheels 202 and 204 formed by monocoque construction and/or with a strong, lightweight material such as a carbon-fiber composite. Further, a treaded wearing surface can be provided by applying neoprene or similar material to the contact area of the wheels. This embodiment provides a strong, lightweight wheel system. Previous gurney designs, in contrast, typically had heavy wheels which accounted for a significant portion of the total weight of the gurney.

The base 200 can also include molded-in recesses 224 and 227 designed to accommodate the upper sections of the scissors linkages and the lower parts of the patient support structure 400 when the scissors linkage is in a lowered position. For example, the molded-in recess 224 at the head of the base 200 is shaped to accommodate the molded portion of the body 410 which holds the compressed gas cylinder 416. The molded-in recess 227 at the foot of the base is shaped to accommodate the central portion 313 of the central scissor linkage member 304. The base 200 can include tracks 220 that allow the scissors linkage to slide as necessary for the raising and lowering of the cot. In this way, the device 100 can be lowered to a position with minimal space between the base 200, the scissors linkage members, and the patient support structure 400.

Figure 5:
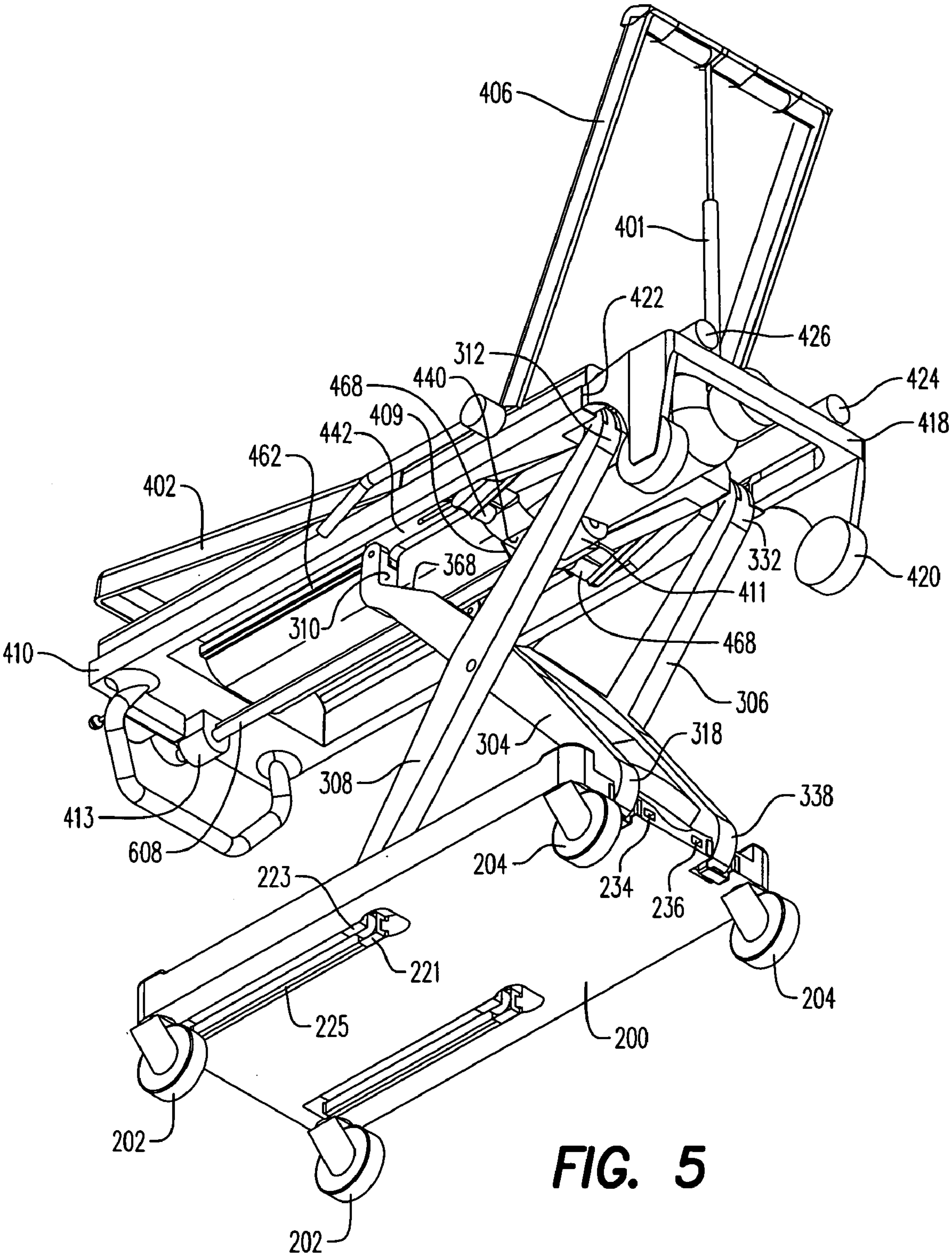
FIG. 5 is another perspective view of the lift-assisted device showing the underside of the patient support structure and the base.

The tracks 220 can be located within slot-shaped recesses in the base 200. In an exemplary embodiment, linear bearings are arranged either at the bottom surfaces of the scissors linkage members or in the tracks 220 of the base 200, or both. As illustrated in FIG. 5, C-shaped linear bearings 221 and 223 are arranged on either side of the sliding end 314 of the outer scissors linkage member 308. The linear bearing 221 moves in a longitudinal direction along the corresponding linear protrusion 225 on an inside wall of the base 200. The linear bearing surfaces can be formed of various materials, including DELRIN, lubricated plastic, NYLOTRON, or any other suitably slick material.

The base 200 can also include modular attachment points and recesses for accessories, for example, stair glide devices and snow skis, among others, as discussed in later paragraphs.

A non-skid strip of material 208 can be located on an upper surface of the base 200 to allow rescuers to safely stand on the base 200 as it is rolled along by other team members, for example, when the rescuers are performing CPR on a patient being transported. The non-skid strip of material 208 can be formed integrally with the base 200, or can be applied to the already-formed base 200 as an adhesive backed non-skid strip or as a non-skid paint, for example.

The base 200 can also include attachment points 232, 234, and 236 for attaching the base to ambulance structure, as discussed in greater detail in later paragraphs.

Figure 4:
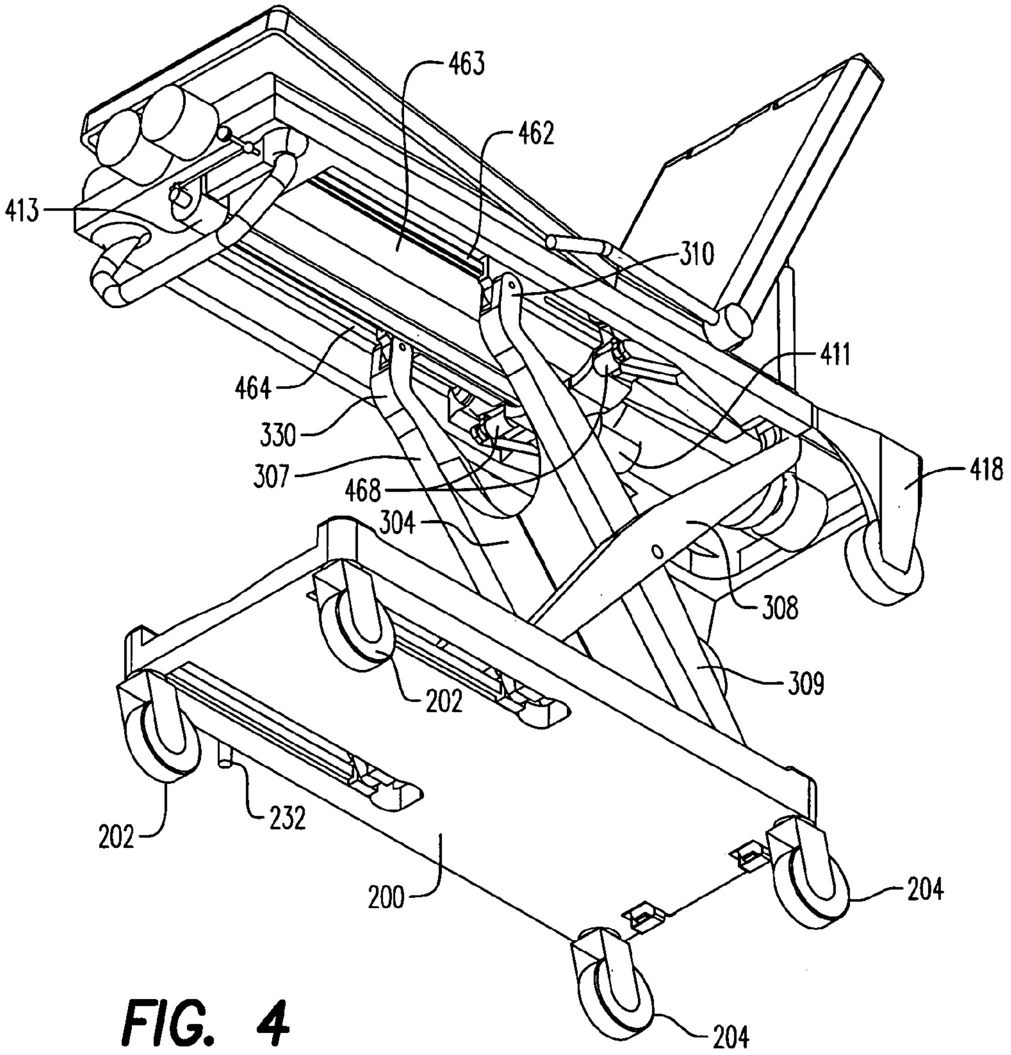
FIG. 4 is a perspective view of the lift-assisted device showing the underside of the patient support structure and the base.

As illustrated in FIG. 4, the base 200 has one or more attachment points for mounting the device to the ambulance mounting brackets. A first attachment point can be a pin 232 extending below the lower surface of the base 200, slightly behind and outside one of the front wheels 202. A spring-loaded bracket (not shown) mounted to the wall 508 of the ambulance engages the pin 232.

Figure 3:
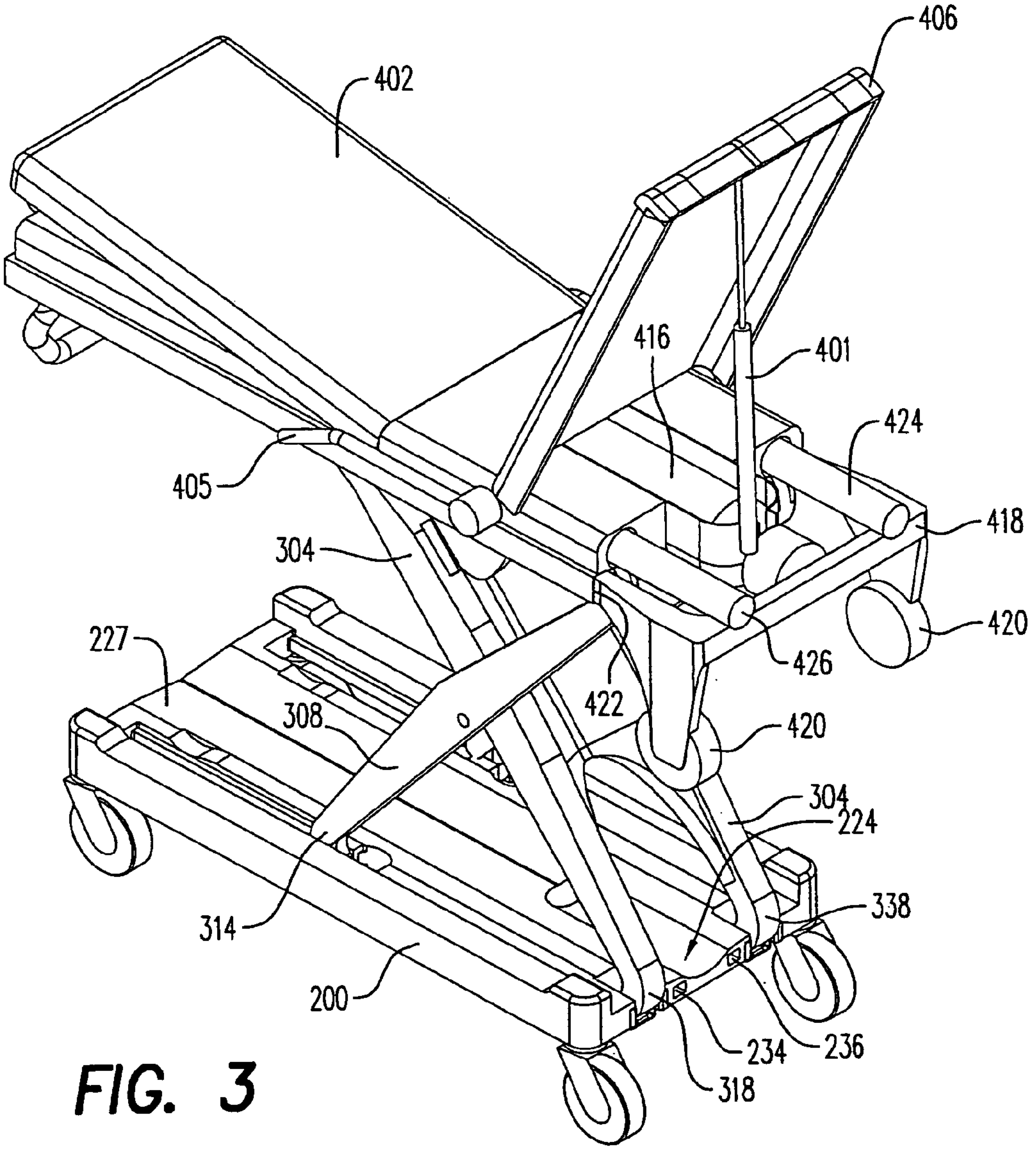
FIG. 3 is another perspective view of an exemplary embodiment of a lift-assisted device according to the present invention.
Figure 15A:
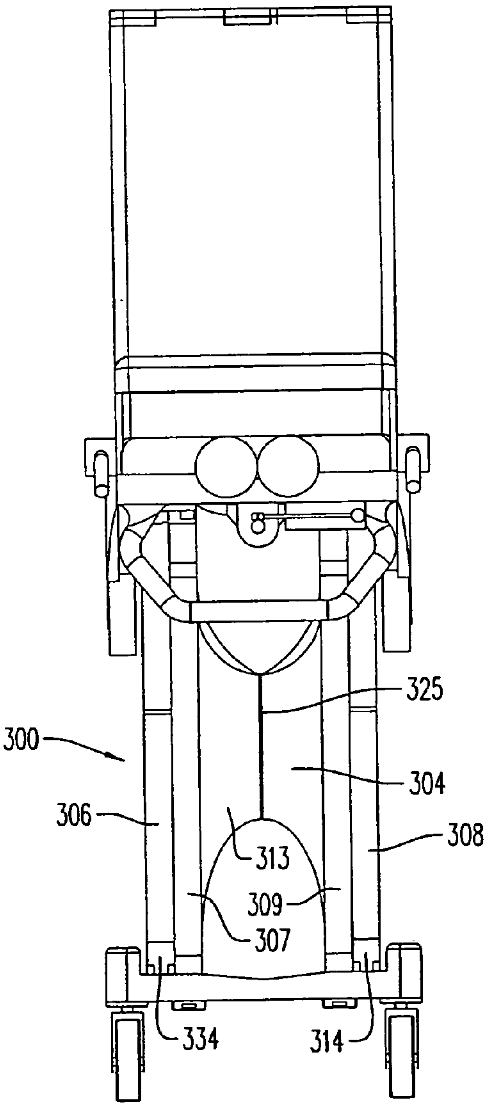
FIG. 15A and 15B are front and rear views of an embodiment of the patient transport device.

Attachment points can also be provided in the base 200 for interfacing with mounting brackets on the ambulance floor. In an exemplary embodiment, and as illustrated in FIGS. 3, 5, and 15A, two additional attachment points in the form of slot-shaped molded-in recesses 234 and 236 are formed in the in the rear (head end) surface of the hollow base 200. The wear resistance of the base at these attachment points can be increased by providing strengthening members, such as, for example, metal sleeves (not shown) affixed within the recesses 234 and 236 of the base.

Figure 12:
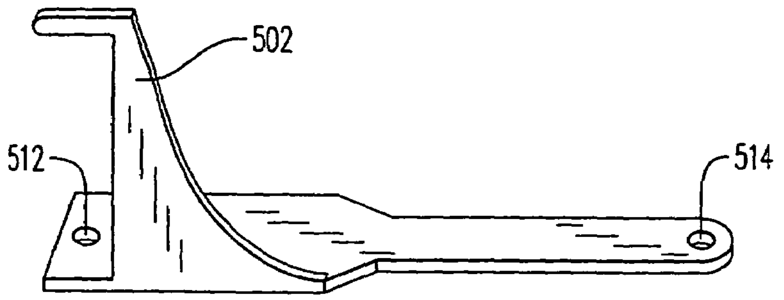
FIG. 12 illustrates a mounting bracket for use with a patient transport device.

Mounting brackets 502 (FIG. 12) are affixed to the floor of the transport vehicle at locations which allow them to fit within the recesses 234 and 236 when the gurney is pushed into its transport position. The sleeves can be curved in an outward direction at the mouth of each opening to encourage the mounting brackets 502 to enter the sleeves and to align the base 200 with the mounting brackets. The mounting brackets 502 can be bolted to the floor of the transport vehicle at bolt holes 512 and 514, or affixed by any other suitable method.

In operation, the EMT crew member pushes the gurney along the floor of the transport vehicle until the mounting brackets 502 are seated in recesses 234 and 246. The third, spring-loaded mounting bracket engages the pin 232, thus providing a three-point attachment which resists disengagement. To disengage the gurney, the EMT crew member disengages the spring-loaded mounting bracket and slides the gurney away from the brackets 502. In this embodiment, the base 200 is attached to the ambulance at three attachment points, although any suitable attachment devices can also be used, and the number of attachment points may be greater or fewer than three.

The undercarriage 300 can include a scissors linkage or "X-frame" 302 for supporting the patient support structure 400 and for raising and lowering the patient support structure 400 relative to the base 200, or the base 200 relative to the patient support structure 400.

As illustrated in FIG. 1, the scissors linkage 302 includes a central scissors linkage member 304, and outer scissors linkage members 306 and 308 arranged on each lateral side of the central scissors linkage member 304. The central scissors linkage member 304 is pivotally attached to the scissors linkage members 306 and 308 by means of one or more pins extending through holes in each of the scissors linkage members 304, 306, and 308.

The central scissors linkage member 304 is pivotally attached to the base 200 and is slidingly attached to the patient support structure 400. The outer scissors linkage members 306 and 308 are pivotally connected to the patient support structure 400 and are slidingly connected to the base portion 200. As seen in FIGS. 1 and 5, outer scissors linkage member 308 has a first end 312 pivotally attached to the trunnion 440 at the underside of the patient support structure 400, and a second end 314 slidably attached to the base 200. Similarly, outer scissors linkage member 306 has a first end 332 pivotally attached to the underside of the patient support structure 400, and a second end 334 slidably attached to the base 200.

Figure 15B:
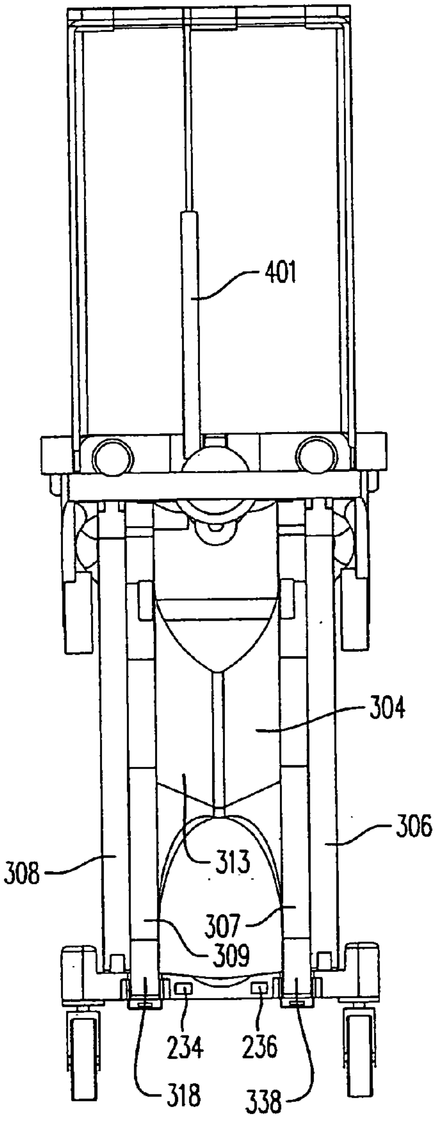

As illustrated in FIGS. 15A and 15B, the central scissors linkage member 304 has two principle structural parts 307 and 309 which extend from the base 200 to the patient support structure 400, as well as a central portion 313 which joins the two principle structural parts 307 and 309 and is symmetrical about a centerline 325. The central portion 313 provides increased resistance to flexure and additional strength to the central scissors linkage member 304, compared to an embodiment in which two independent two principle structural parts corresponding to 307 and 309 are not joined to each other by a central portion.

Movable upper ends 310 and 330 of the central scissors linkage member 304 are slidably attached to an underside part of the patient support structure 400, as illustrated in FIG. 4 and 5. Pivotally attached lower ends 318 and 338 of the central scissors linkage member 304 are pivotally connected to the base 200, as illustrated in FIG. 5.

To raise the patient support structure, movable ends 310 and 330 of the central scissors linkage member 304 move along a path from a front end of the patient support structure 400 in a rearward direction. As the movable ends 310 and 330 move, the pivotally attached ends 318 and 332 pivot about their attachment points. Movable ends 314 and 334 of the outer scissors linkage members 308 and 306 slide in tracks 220 from a front part of the base 200 toward the rear of the base 200, and upper pivotally attached ends 312 and 332 pivot about their attachment points.

Similarly, to lower the patient support structure, the movable ends 310, 330, 314 and 334 are moved in a forward direction.

When the lift-assisted device 100 is in an upright position as shown in FIG. 1, the scissor linkages 304, 306, and 308 form an "x-shaped" configuration: However, when the lift-assisted device 100 is in a lowered position, the scissor linkages members 304, 306, and 308 are nearly parallel to one another, with the ends 310, 312, 330, and 332 which are attached to the patient support structure 400 being higher than the ends 314, 318, 334, and 338 which are attached to the base 200 even when the lift-assisted device is lowered. An advantage of this configuration is that a horizontal force applied to the slidable ends 310 and 330 in a direction toward the pivotally attached ends 312 and 332 will cause the scissors linkage to be raised into the "x-shape" configuration.

Although the foregoing discussion describes the movable ends of the X-frame 302 as being oriented toward the forward or foot part of the device 100, it is also possible to position the movable ends toward the rearward or head part of the device 100.

Advantageously, the scissors linkage members 304, 306, and 308 are each formed of a carbon composite or other lightweight material suitable for applications requiring light weight and high strength. Each of these members can be molded as one piece, or can include several component parts which are later joined together.

Further, although the foregoing describes an embodiment of the undercarriage 300 formed as a scissors linkage or "X-frame", other types of undercarriage members are also envisioned within the scope of the invention. As an example, the undercarriage 300 can include arranged as an H-frame.

The patient support structure 400 includes a first end portion 402, a middle portion 404, and a second end portion 406. As illustrated in FIG. 1, the first end portion 402 and the second end portion 406 are able to be elevated or lowered to either allow the patient to be positioned so that his upper body is in an upright position and/or to have his legs in an upright or downward position. The patient support structure 400 can include a cushion (not shown) on the top surface of the patient support structure 400 so that a user is able to be comfortably positioned on the cushion while being transported.

As illustrated in FIG. 1, a hollow body 410 forms the middle part 404 of the patient support structure 400 between the end parts 402 and 404, and can support the end parts 402 and 404. The patient support structure 400 can also include recesses in which the pneumatic cylinders 424 and 426 are located. The recesses for the pneumatic cylinders and the compressed gas cylinders can advantageously be provided in a hollow body 410. The hollow body 410 is advantageously formed in a monocoque construction, and preferably is formed of a carbon fiber composite.

In an exemplary embodiment, the first end portion 402 and second end portions 406 are hinged to the hollow body 410. When lowered, the end portions provide a flat surface on which the patient reclines. When raised, the end portions provide access to recesses in the hollow body used for storing compressed gas cylinders and other equipment.

The patient support structure can also include front loading wheels 420 incorporated into the cot at the head end of the body 410. A support structure 418 for the front loading wheels 420 can be detachable from the body 410, or can be retractable to retract in a horizontal direction at least partially into molded-in recesses 422 in the body 410. For loading of the device into a transport vehicle, the support structure 418 is pulled partially from its recess and the device 100 is arranged at the door of the transport vehicle with the front loading wheels 420 on the floor of the transport vehicle. The base 200 is then raised, and the device 100 is pushed into the transport vehicle so the base wheels 202 and 204 rest on the floor of the transport vehicle.

As pneumatic lift cylinder 401, or any other suitable device, can be used for maintaining the end portion 406 in a raised position to elevate the patient's head and upper torso. The pneumatic lift cylinder 401 can be attached at one end to the end portion 406 and to the hollow body 410 at the other end.

In the embodiment illustrated in FIG. 1, the patient support structure 400 can have a power-assisted height adjustment and locking mechanism which lifts the patient transport surface. Alternatively, the patient support structure 400 can be manually lifted and lowered without any power-assist device.

The lifting and lowering mechanism can be powered by any suitable power source, or a combination of such power sources. In one embodiment, the power source includes one or more pneumatic cylinders pressurized by compressed air, oxygen, or other gas. Many gases are readily available in containers such as pressurized cylinders or tanks which may be affixed to or stored in the device 100. In another embodiment, pneumatic accumulators can be pressurized by an AC or DC powered compressor. This compressor can be located on the device 100 or may be located at a remote locations, e.g., in the ambulance or at the station, so the accumulator can be pressurized periodically as needed. In another embodiment, the hollow frame of the patient transport surface can be shaped to function as an accumulator. In another embodiment, one or more hydraulic cylinders can be powered by a small hydraulic motor powered by batteries or other power sources. The hydraulic motor can provide pressurized fluid to actuate a hydraulic cylinder or cylinders for raising and lowering the device 100. In this embodiment, a hollow frame of the patient support structure 400 or base 200 can be the reservoir for the hydraulic fluid. In another embodiment, one or more electric screw drives can raise and lower the patient transport surface.

Additionally, the patient support structure 400 can be lifted and lowered manually if the power system fails or in embodiments which do not include a lifting and lowering mechanism. The crew members can move the height adjustment lock bar 608 to an unlocked position and lift from both ends or the sides to elevate the patient to the desired height, in a manner similar to that used for currently known manual devices 100. The height adjustment lock bar 608 can then be manually moved to the locked position to maintain the patient's position.

Some users may either prefer a super lightweight cot of this design without the power system or for financial reasons may choose to purchase a manual design and add the power components when funds are available. This is feasible due to the design which allows use in a powered or non-powered mode.

In the embodiment illustrated in FIG. 1, the lifting and lowering mechanism includes two pneumatic cylinders 424 and 426. The pneumatic cylinders 424 and 426 can be supplied with compressed gas by any suitable device for supplying compressed gas. In the embodiment illustrated in FIG. 1, the pneumatic cylinders 424 and 426 are supplied with compressed gas by compressed gas cylinder 416.

The patient support structure 400 can also include one or more recesses for storing the compressed gas cylinders 412 and 414. As illustrated in FIG. 1, the compressed gas cylinders 412 and 414 are located in recesses below the first end portion 402 of the patient support structure 400.

These cylinders 412 and 414 can be medical compressed oxygen cylinders for supplying a patient with oxygen during transport. Alternatively, one or both of the cylinders 412 and 414 can be used for providing compressed gas to the pneumatic cylinders 424 and 426, by means of suitable valve and piping arrangements.

One advantage, amongst others, of positioning the compressed gas cylinders 412 and 414 under an end portion 402 is to protect the cylinder from various types of fluids or other substances from coming into contact with the tank, e.g. rain, blood, etc. An end part of the patient transport device 400 can be shaped so as to form a lip which allows only the neck and valve portion of each cylinder 412 and 414 to extend past the lip. The cylinders 412 and 414 can alternatively or additionally be held in place by other restraining devices, such as straps with buckles or other closures.

As illustrated in FIG. 1, the hollow body 410 forms a middle part 404 of the patient support structure 400 between the end parts 402 and 404, and can support the end parts 402 and 404. The hollow body 410 is advantageously formed in a monocoque construction, and preferably is formed of a carbon-fiber composite.

The patient support structure 400 can also include recesses in which the pneumatic cylinders 424 and 426 and associated cylinder rods are located. The recesses for the pneumatic cylinders 424 and 426 and the compressed gas cylinders 412, 414, and 416, can advantageously be molded into the hollow body 410. In one embodiment, the recesses for the pneumatic cylinders 424 and 426 are sized to receive various sizes of pneumatic cylinders. In this way, the device can be adapted to carry very heavy patients or very heavy medical equipment, such as incubators. In this embodiment, smaller pneumatic cylinders can be located in the recesses having a larger diameter than the smaller cylinders, with the smaller pneumatic cylinders held in place by a brace or shim between the pneumatic cylinder and the inner recess surface.

The compressed gas cylinder 416 can be, for example, a self-contained breathing apparatus (SCBA) tank filled with compressed air. Advantages of these tanks are that they are generally corrosion resistant even when the outside surface is damp or wet, are readily available as standard equipment for firefighting and EMT teams, and are non-flammable.

Any suitable compressed gas can be used as the compressed gas source. The use of compressed oxygen is advantageous because emergency medical technicians generally have compressed oxygen with them on emergency calls.

Previously developed systems have used a rubber pneumatic bag or bellows for providing lift to patient transport systems. It has been recognized that compressed oxygen can corrode the rubber material and therefore shorten the useful life of the rubber bags of bellows. The lifting mechanism of the present embodiment does not require the use of a lifting bag or bellows, although it is envisioned that one may be included if desired. Advantageously, the lifting bag or bellows can be made of a material less reactive with oxygen if it is intended that oxygen cylinders will be a power source.

Figure 7:
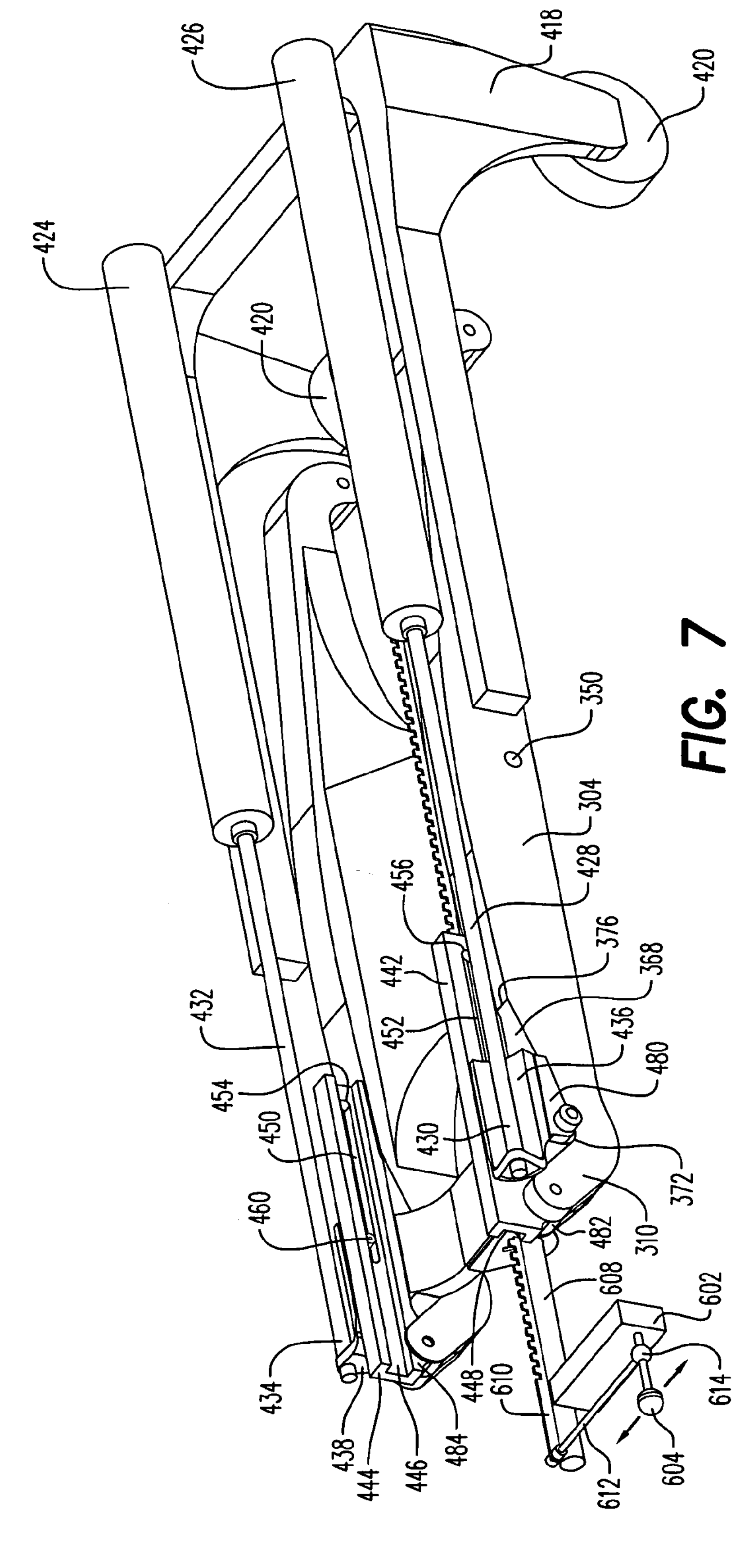
FIG. 7 is a perspective view of a portion of the lift-assisted device including a height adjustment and locking mechanism.

FIG. 7 illustrates the lifting and lowering mechanism which includes the pneumatic cylinders 424 and 426. Central scissors linkage member 304 is shown in a nearly horizontal position, shown without connection to the base 200 for clarity. In this position, the cylinder rods are patient support structure 400 is in a lowered position close to the base 200.

To raise the patient support structure 400, the compressed gas cylinder 416 provides compressed air to one side of the pneumatic gas cylinders 426 and 424 by suitable piping and valving (not shown). For clarity, the following discussion will address the cylinder 426, although the discussion is equally applicable to the cylinder 424. Pressure on one side of a piston due to the introduction of the compressed gas into the cylinder 426 causes the rod 428 to be drawn into the cylinder 426. The cylinder is fixed to the patient support structure 400 so that the cylinder 426 itself will not move.

The trunnion 440 is a slidable support structure for the ends of the cylinder rods, and is arranged approximately horizontally in the area under the body 410 and has a width somewhat less than the width of the patient support structure 400. The ends of the cylinder rods 428 and 432 are each affixed to a flange portion 436 and 438 of the trunnion 440.

When the rod 428 is drawn into the cylinder 426, the flange 436, and thus the trunnion also moves toward the cylinder 426 with the rod 428. The trunnion 440 has two opposed guide members 442 and 444, each of which can have a groove 446 and 448 arranged longitudinally along the length of the guide members, the grooves 446 and 448 facing toward a centerline of the device 100. A slot 450, 452 can extend through each of the guide members 442 and 444 from an outer side of the guide members 442 and 444 to the grooves 446 and 448 on the inside of the guide members. Preferably, the slot 450, 452 extends from about a midpoint of the guide member toward the end of the guide members closest to the cylinders 424 and 426.

Each guide member 442 and 444 can cooperate with a bearing surface of the patient support structure 400. In the embodiment illustrated in FIGS. 4 and 5, the grooves 446 and 448 of the guide members 442 and 444 are slidably engaged with the bearing surface 462 and 464, FIG. 5 illustrates an embodiment in which the guide member 442 fits around the bearing surface 462 on the underside of the hollow body 410. The guide members 442 and 444 can be formed of any suitable material for a slidable bearing surface.

The bearing surfaces 462 and 464 can be affixed to or integrally formed with the underside of the hollow body 410. In particular, the bearing surfaces 462 and 464 can be a molded part of the hollow body 410.

As illustrated in FIG. 7, each of the guide members 442 and 444 have a flange portion 482, 484, which can extend below the main plane of the guide members 442, 444 and below and in front of the trunnion 440. One movable end 310 of the scissors linkage member 304 is pivotally attached to the flange 482 of the guide member 442, and the other movable end 330 of the scissors linkage member 304 is pivotally attached to the flange 484 of the guide member 444 so that the top parts of the scissors linkage member 304 can move together with the guide members toward and away from the cylinders 424 and 426. As the movable ends 310 and 330 of the scissors linkage member 304 moves in a forward and rearward direction, the scissors linkage member 304 rotates about the pivotal attachment point 350.

In an exemplary embodiment, the guide members 442 and 444 are not affixed to the trunnion 440. Instead, the trunnion 440 is arranged to be able to move with respect to the body 410 in a longitudinal direction toward the cylinders 424 and 426 for a distance approximately equal to the length of the slots 450 and 452. Each side of the trunnion 440 has a protrusion 460 which extends from an outside face of the guide member 442 and 442 into the guide member slots 450 and 452.

As the trunnion 440 is drawn toward the cylinders 424 and 426 by the rods 428 and 432, the protrusions 460 travel within the slots 450 and 452 from one end of the slots toward the other ends 454 and 456 of the slots 450 and 452. During this portion of the cylinder stroke the guide members 442 and 444 are stationary. Once the trunnion protrusions 460 reach the ends 454 and 456 of the slots 450 and 452, the cylinder rods 428 and 432 continue to be drawn into the cylinders 424 and 426, and the protrusions 460 apply a force on the guide members 442 and 444 at the ends 454 and 456 of the slots 450 and 452. The guide members 442 and 444 are drawn toward the cylinders 424 and 426, and move along a track molded into the underside of the body 410. As the guide members 442 and 444 move in a direction toward the cylinders, the top portions 310 and 330 of the scissors linkage member 304, which are pivotally fastened to the flanges of the guide member, are also pulled toward the pneumatic cylinders 424 and 426.

In operation, the device can be in a lowered position, with the scissors linkage members 304, 306, and 308 being almost horizontal. An initial mechanical advantage can be gained by arranging the members 304, 306, and 308 at a slight angle so the ends attached to the patient support structure 400 are higher than the ends attached to the base 200.

To gain further initial mechanical advantage for raising the patient transport device 100, the slidable upper ends 310 and 330 of the scissors linkage member 304 can be shaped to cooperate with wheels 468 on the trunnion 440. For example, a ramped portion 368 of a the scissors linkage member 304 extends from a lowermost point 372 (when the member 304 is nearly horizontal) to a point 376 at which the ramped portion 368 joins the central part of the member 304. The guide member 436 of the trunnion 440 can also optionally have a shaped lower surface 480 which has a shape approximately matching the shape of the ramped portion 368.

As the rods 432 and 428 are drawn into the cylinders 424 and 426 by introduction of compressed gas into the cylinders 424 and 426, and as the trunnion 440 is drawn toward the cylinders 424 and 426, the wheel 468 rolls along the ramped portion 368 of the scissors linkage member 306. The rolling motion of the wheel 468 on the upwardly-sloped ramped portion 368 pushes the ramped portion 368 of the X-frame member 304 in a downward direction, which assists in rotating the X-frame member 304 in the clockwise direction, thus assisting in the initial movement of the scissors linkage members 304, 306, and 308 to raise the patient transport surface 400. The mechanical advantage provided can be particularly useful when a patient is supported on the transport device.

In one embodiment, the ramped portions of the scissors linkage members can be a length which is approximately equal to the length of the slots 450 and 452. The length of the ramped portions can alternatively be shorter or longer than the slots. Further, although the ramped portion 368 is shown as forming an angle with the surface 378 of the remaining part of the scissors linkage member 304 at a point 376 where the ramped portion 368 joins the remaining part of the scissors linkage member 304, this connection area could also be a smooth transition.

As the patient supporting portion 400 is raised, the central scissors linkage member 304 rotate in a clockwise direction by pivoting about the pivot point 350 between the scissors linkage members 304, 306, and 308, while the outer scissors linkage members 306 and 308 rotate in a counterclockwise direction. The lower pivotally attached ends 318 and 338 of the outer scissors linkage members 306 and 308 are drawn in a rearward direction along the tracks 220 in the base 200.

Suspension systems on transport vehicles are typically attuned to meeting the handling requirements of emergency driving rather than providing a smooth ride for the sick or injured within. In previous cot designs, the cots were mounted to the ambulance in the lowered position, and did not allow the patient to be transported in a raised position. Nor do previous cots have any practical way to raise the cot once it is placed in the transport vehicle. Further, previous cot designs have been attached to the transport vehicle in a way will transmit the road shock to the patient without any buffering. As a result, victims who are frequently suffering from multiple fractures, head injuries, spinal injuries etc. can have their condition worsened due to a rough ride during transport. Further, keeping the patients in such a lowered position has led to problems.

First, certain critical treatment procedures performed by paramedics during transport, such as intravenous therapy and endotracheal intubation, are difficult to perform when the patient is in a lowered position. Inserting the catheter needle associated with administering intravenous fluids and medications can be difficult under the best of circumstances. Attempting this procedure while a patient is in a low position only adds to the difficulty. In endotracheal intubation, an endotracheal tube is inserted into the trachea of the patient who is either apneic or is affected by a compromised airway. One critical aspect of endotracheal intubation is that as a laryngoscope is inserted into the oropharynx the care giver must be able to visualize the vocal cords so as to ascertain that the tube passes between them as it enters its proper position in the trachea. In instances where this anatomy cannot be visualized it is possible for the tube to pass by the tracheal opening and thus be incorrectly placed within the esophagus. The result of this treatment error is almost always patient death. Previous cots which cannot be elevated during transport prevent the visualization of the vocal cords, resulting in frequent esophageal intubation.

Further, lowering the patient's arm below the torso during transport is desirable to allow peripheral distension of the veins of the extremity. This serves to engorge the veins, allowing easier initiation of the intravenous therapy. However, when the patient is in a lowered position, such as is the case in previous cot designs, it is difficult to lower the patient's arm over the edge of the cot without hitting the often contaminated floor of the vehicle.

In a present embodiment of the device 100, attaching the base 200 to the wall and/or floor of the transport vehicle allows the scissors linkage members to provide cushioning of the patient during transport, as discussed in later paragraphs.

In a present embodiment of the device 100, the patient support structure 400 can be kept at a somewhat raised transport position during transport of the patient. The transport position can be a position between the lowermost position and the uppermost position. This has several beneficial aspects First, because the patient support structure 400 is elevated, the hand and arm can be lowered over the edge of the device 100 without hitting the contaminated floor of the vehicle. Additionally, allowing the paramedics to work in a more comfortable position as opposed to kneeling on the floor on bent knees can reduce the chance that they may inadvertently stick themselves with needles. In using previous cot designs, such inadvertent needle sticks have been a not infrequent occurrence which can possibly lead to infecting the care giver with deadly diseases such as hepatitis and AIDS. Further, endotracheal intubation can more quickly and effectively be accomplished when the patient is in the raised position on the device 100. Also, because the patient is in a raised position, the paramedics have better access to the patient's airway, resulting in reduced mortality and morbidity.

Several features of the device 100 make it better suited for transport in a raised position. First, when the components are formed with monocoque construction methods using materials such as carbon-fiber resin composites, the device 100 itself is considerably lighter than previous cots, making the cots less likely to turn over during transport. Further, the construction of the scissors linkage members provides sufficient flexural rigidity to avoid excessive swaying of the patient support structure 400 during transport. For example, and as illustrated in FIGS. 16A and 16B, the central scissors linkage member 304 can be formed in one piece, with central structural parts 313 and 315 formed so they are extend along a significant portion of the length of the central scissors linkage member 304, providing structural integrity to the X-frame.

In an exemplary embodiment of the device 100, once the base 200 has been mounted in the ambulance's mounting brackets, the patient support structure 400 is raised slightly to its transport position, and the locking mechanism is engaged. If desired, the locking mechanism can then be disengaged so the patient support structure will be cushioned against shocks by an amount of compressed air in the cylinders 426 and 424. The cylinders 424 and 426 and scissors linkage members thus provide a cushioning effect that moderates or eliminates the jolting typically experienced during transport. This feature can be lifesaving to many patients and beneficial to all in that already serious conditions are not exacerbated by jolting during transport.

In another embodiment, the cushioning effect can be accomplished by positioning an air spring or other spring component between the x-frame members or between the x-frame members and the patient surface or base 200.

The base, scissors linkage members, and patient support structure 400 can each advantageously be formed of a hollow monocoque construction. In an exemplary embodiment, these components are composites formed of carbon-fiber reinforcing fibers and a resin. Such a construction provide a lightweight frame which can weigh approximately 30 pounds.

One method for forming the components includes placing a sheet of carbon-fiber impregnated with a resin on the inside surface of a female mold having the contour corresponding to the desired contour of the finished piece. The mold is placed in a vacuum chamber to force the sheet into the contours of the mold. The resulting composite shape can then be cured in place. Various alternative methods for forming the composite components may also be used.

While some of the components can readily be formed as a single piece, e.g., the end part 402 of the patient support structure, other components are preferably formed as two or more pieces which are later joined together. For example, a main body of each of the scissors linkage members can be formed as two halves, then joined along a seam. In addition, the ends of the scissors linkage members can be separately formed with holes for the attachment pins, then joined to the separately formed main body of the scissors linkage members.

High-stress portions, such as the end portions of the scissors linkage members 304, 306, and 308, and the area surrounding the joints between the scissors linkage members, can be formed with a greater thickness and/or a greater carbon fiber density. The light weight, rigidity, and high strength of the components allows the device 100 to have a loading height of approximately 33½ inches. Further, the length of the base 200 and the length of the scissors linkage members be increased or decreased to provide a greater or lesser loading height.

In addition to fully extended and fully collapsed positions, it is also preferred that at least one other position, and preferably multiple positions between these extremes, be available. These multiple heights are useful for transferring patients from the different situations where they are found such as a bed, sofa, floor, automobile seat, or ground, to the patient support structure 400. It is also common that the patient can be transferred from the patient support structure 400 to surfaces of various heights such as beds or x-ray tables upon arrival at the receiving facility.

Two goals for a design of a height adjustment/locking mechanism are that it should be simple to employ and it should maintain the chosen height position in a safe manner.

The height adjustment and locking mechanism 600 illustrated in FIGS. 1 and 7 can provide these functions, although various other height adjustment and locking mechanisms can also be employed. As illustrated in FIG. 1, the control handle 604 is arranged below the body 410 and extends from under the foot end of the body 410, so the crew member has access to the control handle to raise and lower the device 100. In an embodiment illustrated in FIG. 7, a locking bar 608 extends in a longitudinal direction under the end part of the body 410. The ends of the locking bar 608 are supported to allow rotation of the bar 608 around its longitudinal axis, and preferably, in such a way that the locking bar 608 does not move in a longitudinal direction with respect to the body 410. As illustrated in FIG. 4, the foot end of the locking bar 608 can extend through a molded part 413 at the underside of the body 410 and through another molded part 411 at the at the other end of the locking bar 608 which allow rotation. As the trunnion 440 moves toward and away from the pneumatic cylinders 424 and 426, an amount of the locking bar 608 extending beyond the trunnion 440 will change.

The locking bar 608 can be rotated into a unlocked position in which the trunnion 440 is free to move in the longitudinal direction relative to the locking bar 608. When the locking bar 608 is in the unlocked position, the patient support structure 400 can be raised or lowered by the pneumatic cylinders. When the locking bar is rotated into a "locked" position, the trunnion 440 is prevented from moving relative to the locking bar, and the pneumatic cylinders 424 and 426 cannot raise and lower the patient support structure 400.

The locking bar 608 can have notches arranged along an upper portion 610 for engaging the trunnion 440 to unlock or lock the trunnion into position.

Figure 8:
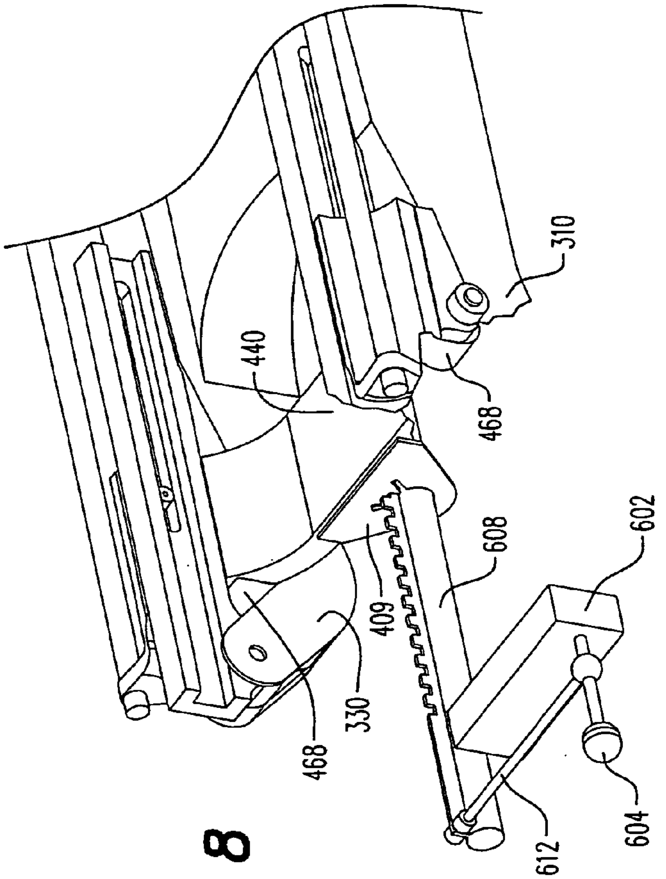
FIG. 8 is a partially cut away perspective view illustrating the height adjustment and locking mechanism.
Figure 9B:
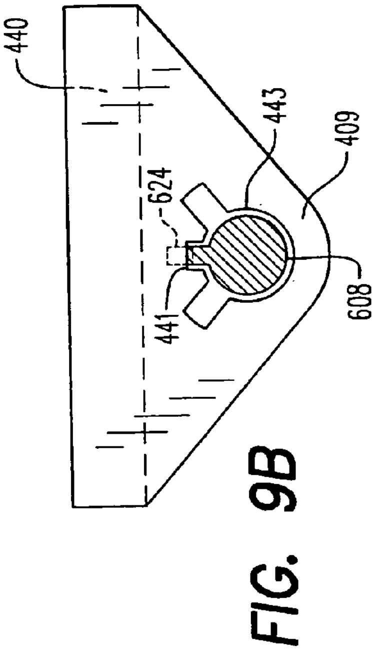
FIG. 9B is an end view of the locking bar and the trunnion portion of the lift-assisted device when a locking bar is engaged, cut away to illustrate a locking bar notch behind a trunnion plate.
Figure 9A:
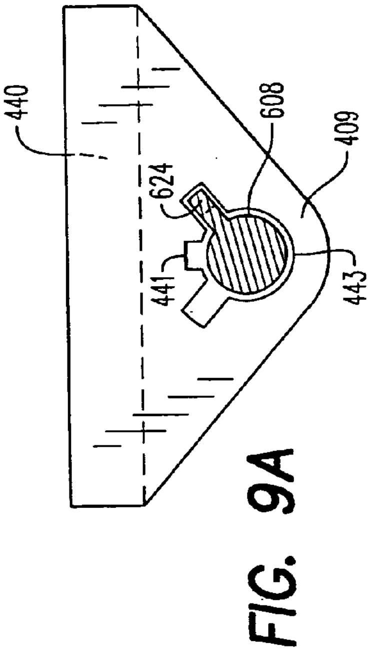
FIG. 9A is an end view of a trunnion portion of the lift-assisted device when a locking bar is disengaged.

In the embodiment illustrated in FIGS. 8, 9A and 9B, the trunnion 440 has a plate 409 with an opening 443 arranged so the locking bar 608 extends through the opening 443. The opening 443 in the plate 409 is shaped at the top with two upwardly extending slots offset on either side of a downwardly extending plate notch 441. The slots in the plate 409 on either side of the plate notch 441 are large enough to provide at least two unlocked positions, one on each side of the plate notch 441 to allow for an unlocked position for raising and an unlocked position for lowering the patient transport portion 400.

The locking bar 608 is aligned relative to the trunnion 440 and the plate 409 so that when the locking bar 608 is in a unlocked position, as shown in FIG. 9A, the notched top surface of the locking bar 608 is aligned with one of the slots in the plate 409, allowing movement of the trunnion 440 and plate 409 relative to the locking bar 608. When the locking bar 608 is in an unlocked position and the pneumatic cylinders 424 and 426 are activated, the trunnion 440 with the attached plate 409 moves along the length of the notched locking bar 608. FIG. 9A illustrates the locking bar in one of the unlocked positions, with the notched upper portion 610 of the locking bar 608 aligned with a slot in the opening 443. In this position, the trunnion 440 can move freely in the longitudinal direction.

Figure 11:
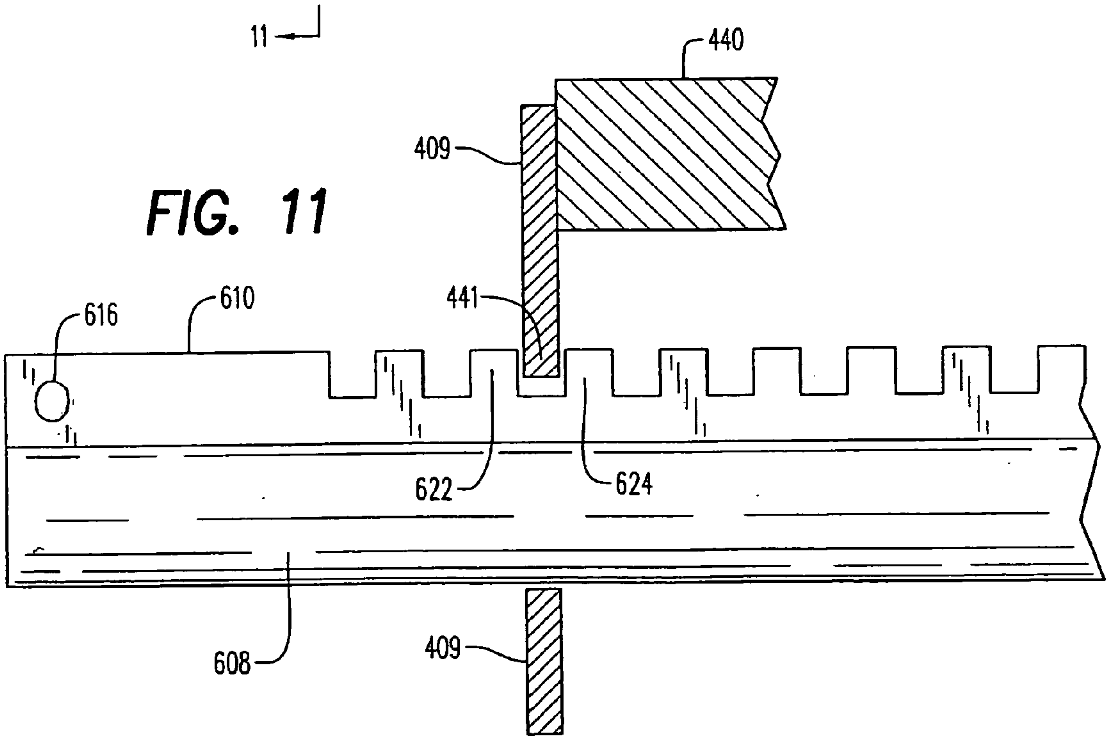
FIG. 11 is a cross sectional view of the FIG. 10 height adjustment and locking mechanism and a trunnion.

When the desired patient surface height is attained the locking bar 608 can be rotated into an locked position, as illustrated in FIGS. 9B and 11, so that a locking bar notch 622, 624 is arranged on each side of the plate 409, thus preventing the trunnion 440 from moving, and locking the patient transport surface at the desired height.

To control the height of the patient support structure 400, the control handle 604 also controls the pneumatic control valve 602, which controls the amount and direction of compressed air flow into the pneumatic cylinders 424 and 426. In an exemplary embodiment, the pneumatic control valve 602 is a three-way, five position valve which can provide air to either side of the pneumatic cylinders 424 and 426 to raise or lower the patient support structure 400. The control handle 604 for the pneumatic control valve 602 can be a finger activated control handle that is spring loaded to return to a center position so that when the control handle 604 is not being operated, it returns to the center position. Moving the control handle 604 to the left raises the patient support structure 400, and moving the control handle to the right lowers the patient support structure 400.

Figure 10:
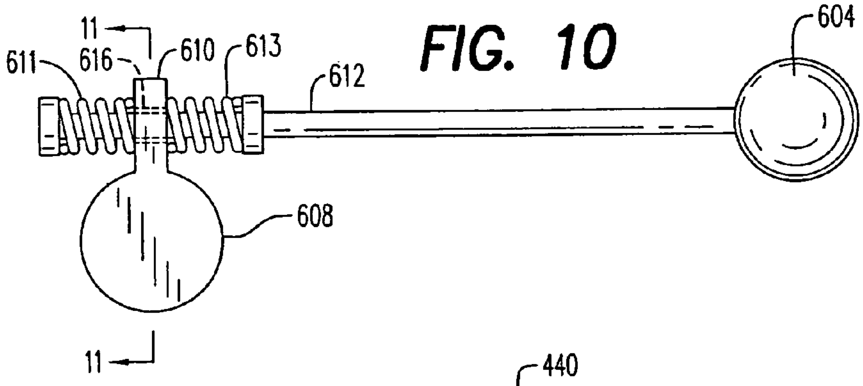
FIG. 10 is an end view of the height adjustment and locking mechanism.

As illustrated in FIGS. 7, 8, and 10, the locking bar 608 is also controlled by the lifting control handle 604. A push rod 612 is attached near the base of the control handle 604 at a ball joint 614 and extends through an opening 616 in the locking bar 608 near the end 606 of the notched locking bar 608. The opening 616 is located in the upper portion 610 of the locking bar 608. By pushing the push rod 612 toward the locking bar 608, the locking bar 608 is rotated in the counterclockwise direction, and by pushing the push rod 612 away from the locking bar 608, the locking bar 608 is rotated in the clockwise direction. As illustrated in FIGS. 10 and 11, the opening 616 in the upper part 610 of the notched locking bar 608 can be slightly elongated in the vertical direction to allow the rotation of the bar 608 in either clockwise or counter clockwise with the push rod 612 essentially horizontal. Springs 611 and 613 can be positioned on both sides of the locking bar 608 to return it to a default position when the control handle 604 is not in use. In one embodiment, the springs are fixed to the push rod 612 so as to exert equal pressure on either side of the upper portion 610 of the locking bar 608 when the locking bar is in a neutral, locked position.

Thus, the control handle 604 can simultaneously control both the pneumatic control valve 602 and the locking bar 608. Thus, movement of the control handle 604 can simultaneously disengage the locking mechanism and control the air flow to raise or lower the patient support structure 400. The operation of both functions with a single movement of a control handle 604 frees the operator to accomplish other tasks. Further, the automatic engagement and disengagement of the locking mechanism when the control handle is operated reduces the likelihood that the locking mechanism could unexpectedly release or bind, so the operator is not required to stop a sudden fall of the patient and device which might occur if the locking mechanism and the lifting mechanism were separately controlled.

As the control handle 604 is moved to the left or right to raise or lower the patient support structure 400, force is applied to the push rod 612 and a corresponding spring, rotating the locking bar 608 into alignment with one of the slots in the trunnion plate 409. In operation, after the patient transport portion is raised or lowered to a desired height, the operator releases the control handle, allowing the notched locking bar 608 to return to the neutral position, thus automatically locking the device at the desired height. A patient can then be loaded onto the patient support structure 400. Due to the increased load on the patient support structure 400, the trunnion plate 409 will apply downward pressure on the locking bar 608. If the control rod 604 is then actuated to again raise or lower the device, the downward force exerted by the trunnion plate 409 on the locking bar 608 may prevent an immediate response of the locking bar 608. If the locking bar 608 does not immediately rotate to the unlocked position, one of the springs 611 or 613 will be compressed by the motion of the control handle 604 and rod 612, exerting a clockwise or counterclockwise force on the upper notched part 610 of the locking bar 608. As the force exerted by the pneumatic cylinders 424 and 426 overcomes the notch/trunnion plate interface pressure, the compressed spring forces will rotate the notched locking bar 608 into one of the unlocked positions, allowing movement of the trunnion and trunnion plate, and corresponding upward or downward movement of the patient transport portion 400. To the user this disengagement can occur with such speed as to seem instantaneous. The pressure exerted upon the notch/plate interface when the load on the patient support structure 400 is reduced, such as can occur when the patient is moved to a hospital bed, is relieved in a similar manner by movement of the control handle 604 in an opposite left or right direction.

The control handle 604 itself can also be equipped with a device for limiting its movement so as to control the speed of lifting and lowering. For example, the control handle 604 can be fitted with a finger activated guard (not shown) which also allows a faster speed of movement during the undercarriage retraction required for loading. To reduce the time spent supporting the foot end of the cot when the loading wheels are in the transport vehicle, the crew member operating the control handle can move the guard aside and increase the speed of retraction. The guard can also prevent the excessive movement of the control handle when lowering the gurney with a patient aboard, thus preventing a movement that may be uncomfortable to the patient and unsafe for the crew members.

Although the lifting mechanism 600 is shown located at the foot end of the lift-assisted device so that a person, e.g. an EMS crew member, has access to lifting mechanism, it will be recognized that the lifting mechanism could be located in other positions on the device 100. Further, the height adjustment/locking mechanism 600 can include a different control for height adjustment and for locking the gurney at the desired height, rather than the integrated control handle 604 described in the preceding paragraphs.

It will also be recognized that while the notched locking bar 608 is shown with the notches on the top surface, the notched surface of the locking bar 608 and trunnion plate 409 can also be arranged in a different orientation. Similarly, the control handle 604 and push bar 612 can be oriented in another position with respect the notched locking bar 608, so that movement of the control handle in other directions than left and right would control the pneumatic valve 602 and the locking mechanism.

While the preceding descriptions describe raising or lowering the patient support structure 400 with respect to the base 200, it is also desired to be able to raise or lower the base portion 200 with respect to the patient support structure 400. To raise or retract the base portion 200 toward the patient support structure, the control handle 604 is moved in a direction corresponding to that for lowering the patient support structure 400, e.g., to the right. As the control handle 604 is moved, the locking mechanism is released and the pneumatic control valve 602 directs air from the compressed air cylinder 416 to the pneumatic cylinders 424 and 426. The air flow into the pneumatic cylinders 424 and 426 moves the control rods 428 and 432 in a direction away from the cylinders 424 and 426, thus pushing the trunnion 440 and the ends 310 and 330 of the central scissors linkage member 304 in a direction away from the cylinders 424. Movement of the X-frame scissors linkage members toward a horizontal position will raise the base 200 toward the patient transport surface, which is supported on the front loading wheels 420. When the base 200 has been raised to the desired height, the operator releases the control handle 604, allowing the control handle 604 and the locking bar 608 to return to their neutral positions, stopping the further flow of air and engaging the locking mechanism.

The device 100 can also be provided with components suitable for protecting the patient from the weather, for transporting the device 100 and the patient over irregular surfaces, and for supporting medical equipment.

Sick and injured patients are subject to inclement weather as they are moved to the transport vehicle and from the vehicle to the receiving facility. To add to their discomfort they are typically positioned on their backs with their faces exposed to rain, snow etc. Transport teams may attempt to shield the patient's upper torso and face with blankets, sheets or other equipment of supplies at hand. Heavy gauge clear plastic, designed to fit over the patient has been marketed for weather protection. This material is clumsy to handle and frequently settles onto the face of the patient, adding to their discomfort. Moreover, if carried on the transport vehicle, it is commonly folded and stored in a compartment under other equipment so that its use is inconvenient and infrequent.

Figure 13A:
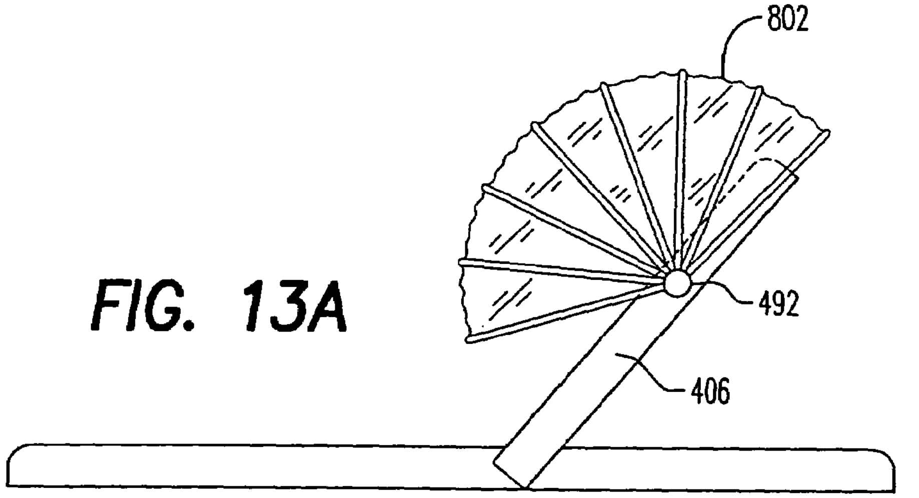
FIGS. 13A and 13B illustrates a cover for a head part of the patient transport device in an operational and in a collapsed position.
Figure 13B:
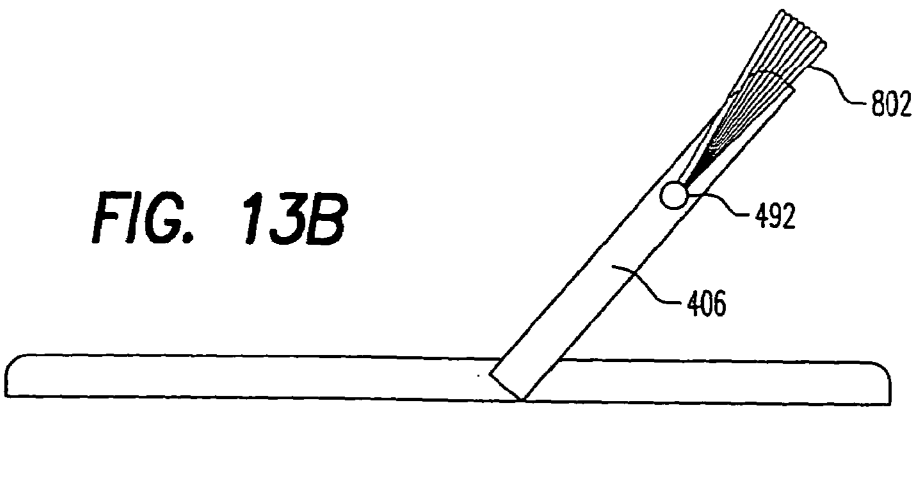

FIGS. 13A and 13B illustrate a cover 802 which can be attached to attachment points 492 on either side of the end part 406 of the patient support structure 400. The cover 802 can be a permanent part of the device 100 or can be temporarily attached only in inclement weather. Until needed or during loading and unloading, the cover 802 can be folded back to a collapsed position at the head of the device 100. When needed the cover 802 can be opened to protect the patient. The material of the cover can be clear or opaque.

Winter conditions present extra difficulties for emergency crews. A commonly encountered circumstance occurs when the cot and patient must be moved thru snow. The additional burden of moving a cot frame and wheels which sink into the snow adds to the overall travails on working in this environment. One or more skis attached to the underside of the base 200 of the device 100 allows the cot and patient to be moved on the snow surface rather than being pulled or pushed through it.

Figure 14A:
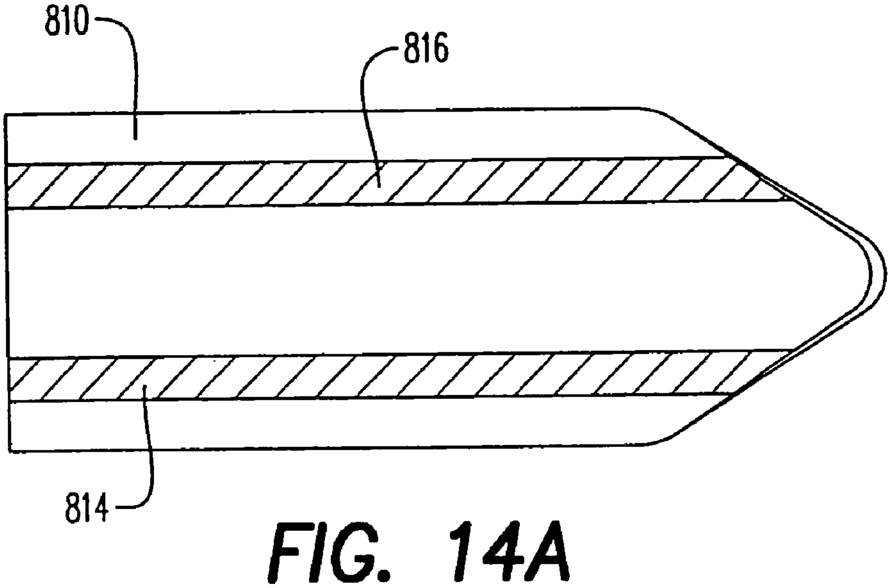
FIGS. 14A and 14B illustrate a ski attachment for the patient transport device.
Figure 14B:
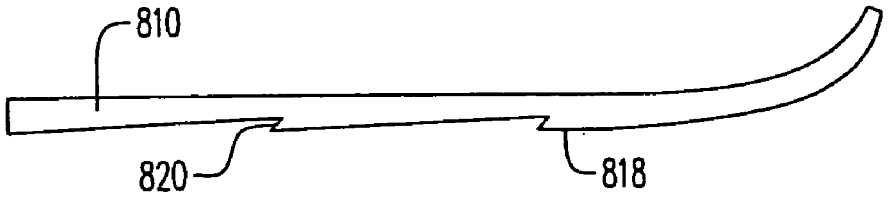

FIGS. 14A and 14B illustrate a slidable terrain engaging structure configured as a ski 810 which can be attached to the underside of the base 200. The ski 810 can be integral to the base or attached as needed. When engaged in the extended position, for example, by means of foot pressure upon an attached lever, the bottom of the skis would be slightly higher than the contact surface of the wheels. This would allow the wheels to provide controlling drag. Further, this relationship permits the device 100 to be rolled when a solid surface such as a road way is reached. The crew can either retract the ski or skis when the firm surface is attained or at a more convenient time during the transport. Two additional features of the underside of the ski or skis can enhance control. A longitudinally extending portion 814 and 816 of the bottom surface of the ski 810 can be in the form of ridges which extend below the remainder of the ski bottom surface to prevent sideways sliding. Alternatively, these portions 814 and 816 can be provides with a rubber-like material to provide friction for restricting sideways. The rubberlike material can also serve as a stair glide when needed. Stepped segments with indentations 818 and 820 arranged transversely across the underside of the ski 801 can minimize any backwards slide.

The majority of the patients that paramedics and convalescent transport teams treat and transport are located in homes, businesses or other buildings where steps or stairs must be negotiated. These are the most common and most dangerous obstacles faced by the care givers. The danger is especially high when the combined weight of the patient and cot must be moved down these structures. During this phase the crew must lift the wheels off the steps to avoid severely jolting the patient. Serious injuries are a frequent result of moving down stairs due to awkward, off balanced maneuvering while supporting substantial weight.

The device 100 can be provided with another slidable terrain engaging structure such as a stair glide (not shown), either permanently attached or as an add-on component, which allows the crew to move the patient and cot down steps and stairs in a much safer manner. The glides (not shown), one on either side of the base 200, can be stored in a folded or retracted position when not needed and extended by the extension/retraction mechanism when stairs or steps are encountered. In the extended position the glides reach almost to ground level. This allows the care givers to slide the device 100 down the steps or stairs as it rests on the glides and still "feel" their way down as the wheels lightly touch each step. When the ground level is reached the glides may be retracted or left in position until loading since the bottom of the glides remain slightly higher than the wheels. The glides may either be constructed as a skid, with a durable surface capable of withstanding the wear of sliding over wooden or masonry surfaces, or designed with replaceable wear surfaces. Another embodiment can include a belted material which moves in a track like fashion as the cot is moved down the steps or stairs. This movement can be facilitated with a tensioned sprocket or screw incorporated to control speed of descent or without tensioning where the crew controls the descent speed.

The device 100 can also be provided with an equipment tray (not shown) for supporting equipment used by the EMT team. For example, patients frequently have their heart function monitored by paramedics using a portable cardiac monitor/defibrillator. It is important to have a means to safely move this device as well as the patient to which it is attached by means of electrode cables. These devices are typically cube shaped and weigh between twelve and twenty pounds. Previously used trays for mounting the monitor/defibrillator to the cot are made of metal with relatively weak methods of attachment. The most common placement for the tray is much like a bed dining tray, i.e., over the patients lap or legs. In the event of a frontal collision, previously used trays have torn loose, allowing the tray and monitor to strike the patient with catastrophic results. A secondary difficulty with the previously used trays is that it is difficult to place the patient on the cot due to the obstruction posed by the side portion of the tray.

The present equipment tray can be formed of a carbon fiber composite or other extremely strong material. In addition to strong attachment points along the side of the foot area of the cot, the equipment tray engages the structure of the foot end of the body 410 of the device with hook-like attachments that prevent forward movement of the tray in the event of a crash. A monitor/defibrillator can be secured to the tray with crash rated belts equipped with buckles for easy attachment and detachment. The design eliminates one side panel on the patient loading side so that movement of the patient on and off the cot is not impeded. The strength imparted by the shape of the foot end hook portion of the tray allow this opening while maintaining the strength needed to protect the patient in the event of a crash.

Figure 16:
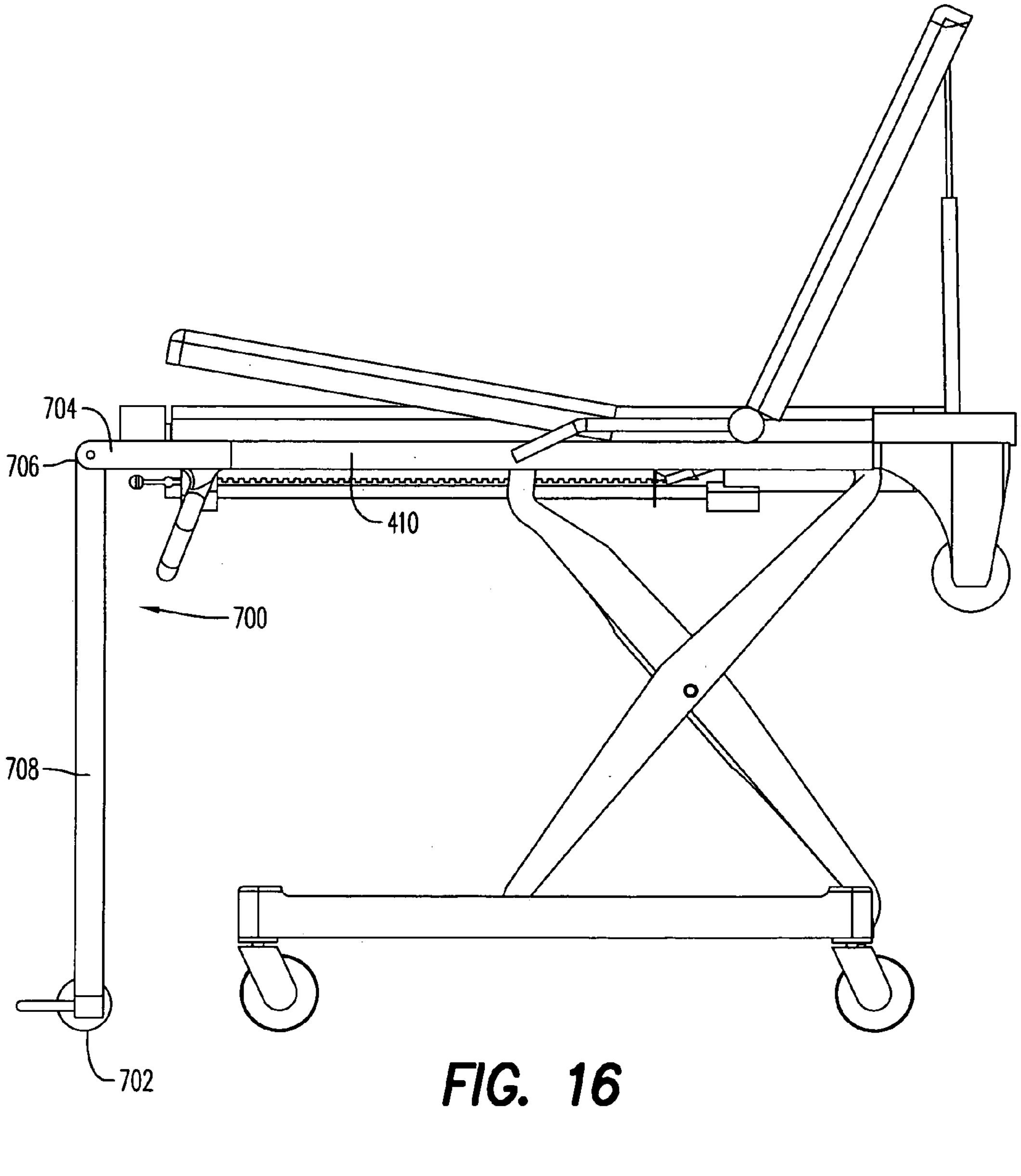
FIG. 16 illustrates a rear loading support structure and wheels in an extended position on a patient transport device according to an embodiment of the invention.

As illustrated in FIG. 16, the device 100 can also be provided with an accessory rear loading wheel or wheels arranged at the foot of the device 100 to assist in loading and unloading the device 100 into the transport vehicle. The support structure 700 with the accessory rear loading wheels 702 can either retract into a stowed away position on the cot when not needed, or be removed completely and stored in the transport vehicle. In the retracted position (not shown), side parts 704 and 708 of the rear loading support structure 700 fit along the sides of the hollow body 410. When needed for loading or unloading, the wheeled end of the rear loading support structure 700 is pulled longitudinally toward the foot of the device 100 and is pivotally lowered so the wheels 702 contact the ground surface. The support structure 700 is then locked into position so that it will not collapse under the weight of the device 100 and patient. An articulated linkage 706 allows the lowered end 708 to be locked into position to support the gurney when the base 200 is retracted. The rear loading support structure 700 can also be detachable from the device 100. In this embodiment, the rear loading support structure 700 can be stored in the transport vehicle and attached and locked into position only when needed for loading and unloading.

When the patient and device 100 are loaded into a transport vehicle, the front loading wheels 420 are placed into the patient compartment of the transporting vehicle. The rear loading wheels 702 and support structure 700 would be lowered or attached at the foot end of the device 100. The undercarriage 300 is then raised, leaving the weight supported by both the front loading wheels 420 on the floor of the transport vehicle and the rear loading wheels on the ground surface. At this point the device 100 can be moved into the vehicle requiring only guiding into the mounting system by the transport team.

During unloading the process would be reversed. The device 100 is positioned with the rear loading wheels 702 are at the edge of the patient compartment, and the rear loading wheels 702 and support structure 700 are then attached or lowered. The device 100 is then rolled out of the compartment until supported by the front loading wheels 420 at the head end and the rear loading wheels 702 at the foot end. The undercarriage 300 is lowered, the rear loading wheels 702 are detached or stowed in their retracted position, and the device 100 is removed from the vehicle.

The rear wheel support structure 700 and/or wheels 702 can also be formed of a molded carbon-fiber composite or similar material.

Although only preferred embodiments are specifically illustrated and described herein, it will be appreciated that many modifications and variations of the present invention are possible in light of the above teachings and within the purview of the appended claims without departing from the spirit and intended scope of the invention.

The invention claimed is:

1. A lift-assisted device comprising:

a patient support structure having a movable yoke;

a base;

an undercarriage extending between the patient support structure and the base;

at least one pneumatic cylinder extending between the movable yoke and a part of the patient support structure for applying a driving force on the movable yoke to raise or lower the patient support structure with respect to the base; and a height adjustment and locking mechanism having a locking bar that is rotatable and has notches for locking engagement with the movable yoke.

2. A lift assisted device as set forth in claim 1, wherein the at least one pneumatic cylinder comprises two pneumatic cylinders.

3. A lift assisted device as set forth in claim 1, wherein the undercarriage has a member attached to the movable yoke for raising or lowering the patient support structure with respect to the base.

4. A lift-assisted device as set forth in claim 1, the undercarriage having:

at least one first scissors linkage member pivotally connected to the movable yoke and pivotally connected to the base, at least one second scissors linkage member pivotally connected to the first scissors linkage member, pivotally connected to the patient support structure, and slidably connected to the base.

5. A lift-assisted device as set forth in claim 4, wherein the first scissors linkage member has two upper ends pivotally connected to the movable yoke, and two lower ends pivotally connected to the base, and wherein the at least one second scissors linkage member comprises two scissors linkage members, each of the second scissors linkage members being arranged laterally outward of the first scissors linkage member and being pivotally connected to the first scissors linkage member, and each of the two second scissors linkage members having an upper end pivotally connected to the yoke and a lower end slidably connected to the base.

6. A lift-assisted device as in claim 4, wherein at least one of the first scissors linkage member and the second scissors linkage member comprises a composite of resin and carbon fiber.

7. A lift-assisted device as in claim 4, wherein each of the first scissors linkage member and the second scissors linkage member is formed of a composite of resin and carbon fiber.

8. A lift-assisted device as set forth in claim 1, wherein the patient support structure comprises a hollow body forming a support for the at least one pneumatic cylinder.

9. A lift-assisted device as set forth in claim 8, wherein the hollow body has at least one recess extending through the hollow body for housing the at least one pneumatic cylinder.

10. A lift-assisted device as set forth in claim 8, the hollow body having at least one additional recess for storing a tank of compressed gas.

11. A lift assisted device as set forth in claim 8, the patient support structure includes a hinged head portion and a hinged foot portion, each of the head portion and the foot portion being pivotally connected to the hollow body.

12. A lift assisted device as set forth in claim 11, wherein the patient support structure includes a lifting cylinder arranged to maintain the head portion in a raised position.

13. A lift-assisted device as set forth in claim 1, wherein the base comprises at least one recessed track for slidable movement of a part of the undercarriage along the track.

14. A lift assisted device as set forth in claim 13, further comprising a bearing disposed in the track between the slidable part of the undercarriage and a surface of the recessed track.

15. A lift-assisted device as set forth in claim 1, including a plurality of wheels for moving the lift-assisted device over a surface.

16. A lift-assisted device as set forth in claim 15, wherein the wheels are of monocoque construction.

17. A lift-assisted device as set forth in claim 15, wherein the wheels are castered and are spring-loaded.

18. A lift-assisted device as set forth in claim 1, wherein the base includes at least one attachment point for attachment of the device to a transport vehicle.

19. A lift-assisted device as set forth in claim 1, comprising at least one compressed gas cylinder in communication with the at least one pneumatic cylinder.

20. A lift assisted device as set forth in claim 19, wherein the compressed gas cylinder is a self contained breathing apparatus tank.

21. A lift assisted device as set forth in claim 19, wherein the compressed gas cylinder is an oxygen tank.

22. A lift-assisted device as set forth in claim 1, further comprising: a valve in communication with the at least one pneumatic cylinder; and a control handle in communication with the valve for providing compressed gas to the at least one pneumatic cylinder.

23. A lift assisted device as set forth in claim 1, comprising at least one loading wheel disposed at an end of the patient support structure.

24. A lift-assisted device as set forth in claim 23, comprising a movable support structure for attaching the at least one loading wheel to the patient support structure.

25. A lift-assisted device as set forth in claim 24, wherein the movable support structure fits partially within a recess in the patient support structure.

26. A lift-assisted device as set forth in claim 24, wherein the movable support structure includes a first end part arranged for slidable engagement with the patient support structure and a second end part supporting the loading wheel and being pivotally connected to the first end part.

27. A lift-assisted device comprising:

a patient support structure having a movable yoke;

a base;

an undercarriage extending between the patient support structure and the base;

at least one pneumatic cylinder extending between the movable yoke and a part of the patient support structure for applying a driving force on the movable yoke to raise or lower the patient support structure with respect to the base; and a height adjustment and locking mechanism having a locking bar positioned for locking engagement with the movable yoke wherein the yoke has a notched opening shaped to receive the locking bar, wherein the locking bar extends through the opening, and notches on the locking bar are adapted to engage a notch of the yoke opening to prevent longitudinal movement of the yoke.

28. A lift-assisted device comprising:

a patient support structure having a movable part;

a base;

an undercarriage extending between the patient support structure and the base;

a power source for applying a driving force to raise or lower the patient support structure with respect to the base; and a height adjustment and locking mechanism including a locking bar that is rotatable and has notches for locking engagement with the movable part of the patient support structure.

29. A lift-assisted device as set forth in claim 28, wherein the undercarriage has a member with an end attached to the movable part of the patient support structure, and wherein the undercarriage member and the movable part of the patient support structure are adapted to move in response to the driving force.

30. A lift-assisted device as set forth in claim 29, wherein the undercarriage member has another end pivotally attached to the base.

31. A lift-assisted device as set forth in claim 28, the height adjustment and locking mechanism having a control device adapted for simultaneous powering of the power source and disengagement of the locking bar.

32. A lift-assisted device as set forth in claim 31, further comprising a valve for operating the power source and a linkage between the locking bar and to the control device for rotating the locking bar.

33. A lift-assisted device as set forth in claim 32, wherein the control device controls the valve and the linkage.

34. A lift-assisted device comprising:

a patient support structure having a movable part;

a base;

an undercarriage extending between the patient support structure and the base;

a power source for applying a driving force to raise or lower the patient support structure with respect to the base; and a height adjustment and locking mechanism including a locking bar positioned for locking engagement with the movable part of the patient support structure;

wherein the movable part of the patient support structure has an notched opening shaped to receive the locking bar, wherein the locking bar extends through the opening, and notches on the locking bar are adapted to engage a notch of the opening to prevent movement of the movable part of the patient support structure.

* * * * *